US012584737B2

(12) United States Patent
Palatshe et al.

(10) Patent No.: US 12,584,737 B2
(45) Date of Patent: Mar. 24, 2026

(54) MEASUREMENT DEVICE WITH INTEGRAL ANGLE FINDER

(71) Applicant: KAPRO INDUSTRIES LTD, Bikat Beit Hakerem (IL)

(72) Inventors: Yossi Palatshe, Tiberias (IL); Alex Hait, Beit Shean (IL); Meny Cohen, Haifa (IL)

(73) Assignee: KAPRO INDUSTRIES LTD, Bikat Beit Hakerem (IL)

( * ) Notice: Subject to any disclaimer, the term of this patent is extended or adjusted under 35 U.S.C. 154(b) by 340 days.

(21) Appl. No.: 18/282,654

(22) PCT Filed: Mar. 31, 2022

(86) PCT No.: PCT/IL2022/050346
§ 371 (c)(1),
(2) Date: Sep. 18, 2023

(87) PCT Pub. No.: WO2022/215065
PCT Pub. Date: Oct. 13, 2022

(65) Prior Publication Data
US 2024/0310170 A1    Sep. 19, 2024

(30) Foreign Application Priority Data

| Apr. 6, 2021 | (IL) | ......................................... | 282106 |
| Sep. 20, 2021 | (IL) | ......................................... | 286550 |
| Feb. 7, 2022 | (IL) | ......................................... | 290393 |

(51) Int. Cl.
| *G01C 9/28* | (2006.01) |
| *G01B 3/56* | (2006.01) |
| *G01C 9/30* | (2006.01) |
| *G01C 9/34* | (2006.01) |

(52) U.S. Cl.
CPC .............. *G01C 9/30* (2013.01); *G01B 3/566* (2013.01); *G01C 9/34* (2013.01); *G01C 9/28* (2013.01)

(58) Field of Classification Search
CPC ................................. G01B 3/566; G01C 9/28
USPC ................................. 33/374, 375, 379, 389
See application file for complete search history.

(56) References Cited

U.S. PATENT DOCUMENTS

| 1,036,601 | A | * | 8/1912 | Frank, Sr. ................ | G01C 9/32 |
| | | | | | 33/388 |
| 1,264,161 | A | | 4/1918 | Costas | |
| 3,681,849 | A | * | 8/1972 | Venables, III .......... | G01C 9/28 |
| | | | | | 33/385 |

(Continued)

FOREIGN PATENT DOCUMENTS

| WO | WO-8808115 A1 * 10/1988 | ............... G01C 9/24 |

*Primary Examiner* — George B Bennett
(74) *Attorney, Agent, or Firm* — Bridgeway IP Law Group, PLLC; Hyun Woo Shin

(57) ABSTRACT

Measurement devices for measuring and marking purposes and including an integral angle finder for enabling two modes of use: placing either major body surface on a flat surface or setting a base on an inclined surface for indicating its inclination. Spirit levels for setting a spaced apart pair of adjacent upright studs of more than one standard stud width at a standard stud separation between the midpoints of spaced apart pair or upright studs. Caster device pair for use with a ladder having a stabilizer for enabling wheeling the ladder while being held generally horizontal by a user for assisting moving the ladder without having to lift its entire weight.

12 Claims, 18 Drawing Sheets

(56)         References Cited

U.S. PATENT DOCUMENTS

| | | | | |
|---|---|---|---|---|
| 3,832,782 A * | 9/1974 | Johnson | ................... | G01C 9/28 |
| | | | | 33/351 |
| 3,894,342 A * | 7/1975 | Goode | .................... | G01C 9/28 |
| | | | | 33/388 |
| 4,073,062 A * | 2/1978 | Wright | .................... | G01C 9/28 |
| | | | | 33/388 |
| 4,320,581 A * | 3/1982 | Ousterhout | ............. | G01C 9/28 |
| | | | | 33/388 |
| 4,481,720 A * | 11/1984 | Sury | ........................ | G01C 9/28 |
| | | | | 33/496 |
| 4,590,682 A * | 5/1986 | Koch | ....................... | G01C 9/28 |
| | | | | 33/383 |
| 5,531,031 A * | 7/1996 | Green | .................. | G01C 15/008 |
| | | | | 33/286 |
| 5,937,371 A * | 8/1999 | Gruetzmacher | ......... | G01C 9/12 |
| | | | | 33/340 |
| 6,418,630 B1 * | 7/2002 | Genevois | ............ | G06G 1/0005 |
| | | | | 33/430 |
| 6,868,616 B2 * | 3/2005 | Allemand | ............ | E04D 15/025 |
| | | | | 33/476 |
| 7,290,346 B2 * | 11/2007 | Szumer | .................... | G01C 9/28 |
| | | | | 33/374 |
| 7,472,487 B2 * | 1/2009 | Tran | ......................... | G01C 9/28 |
| | | | | 33/379 |
| 8,640,351 B2 * | 2/2014 | Chang | ................... | G01C 23/00 |
| | | | | 33/355 R |
| 9,180,725 B2 * | 11/2015 | Lin | ......................... | B43L 7/033 |
| 9,429,424 B2 * | 8/2016 | Butler | .................. | B43L 7/0275 |
| 10,527,415 B2 * | 1/2020 | Burge | ...................... | G01C 9/34 |
| 2002/0088130 A1 | 7/2002 | Szumer | | |
| 2013/0227846 A1 * | 9/2013 | Buzzell | ................ | B43L 7/0275 |
| | | | | 33/32.2 |
| 2016/0047650 A1 | 2/2016 | Butler | | |

* cited by examiner $$T1 > T3 > T2$$
$$H2 < H1$$

$T1 > T3 > T2$

T1 > T3 > T2

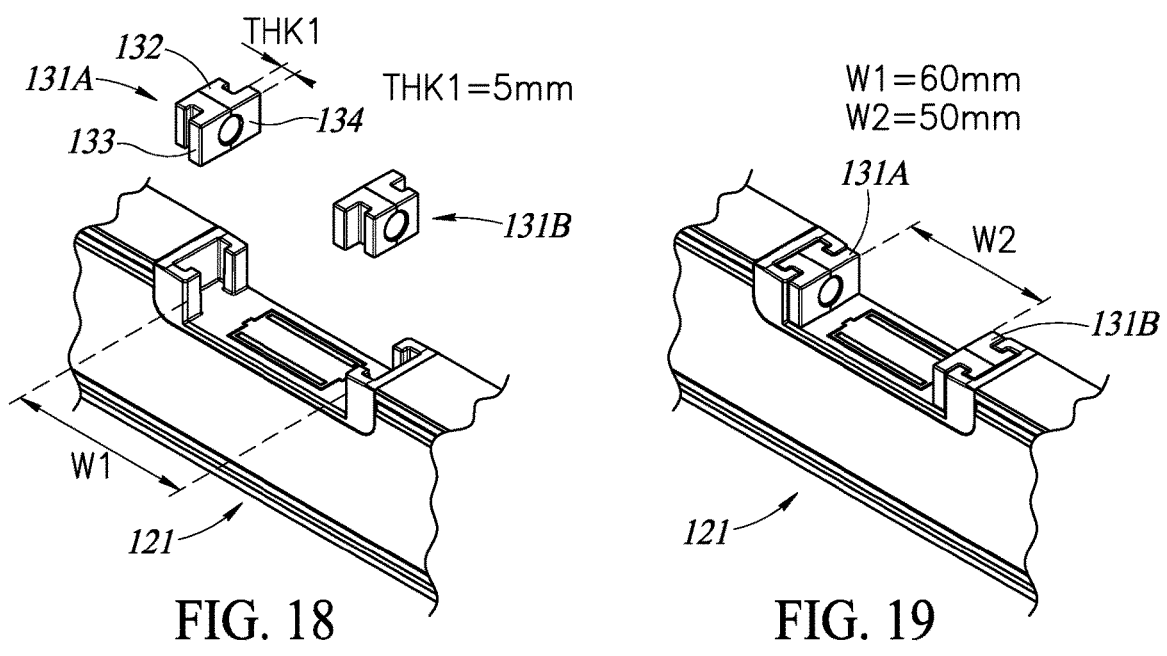
FIG. 18
FIG. 19
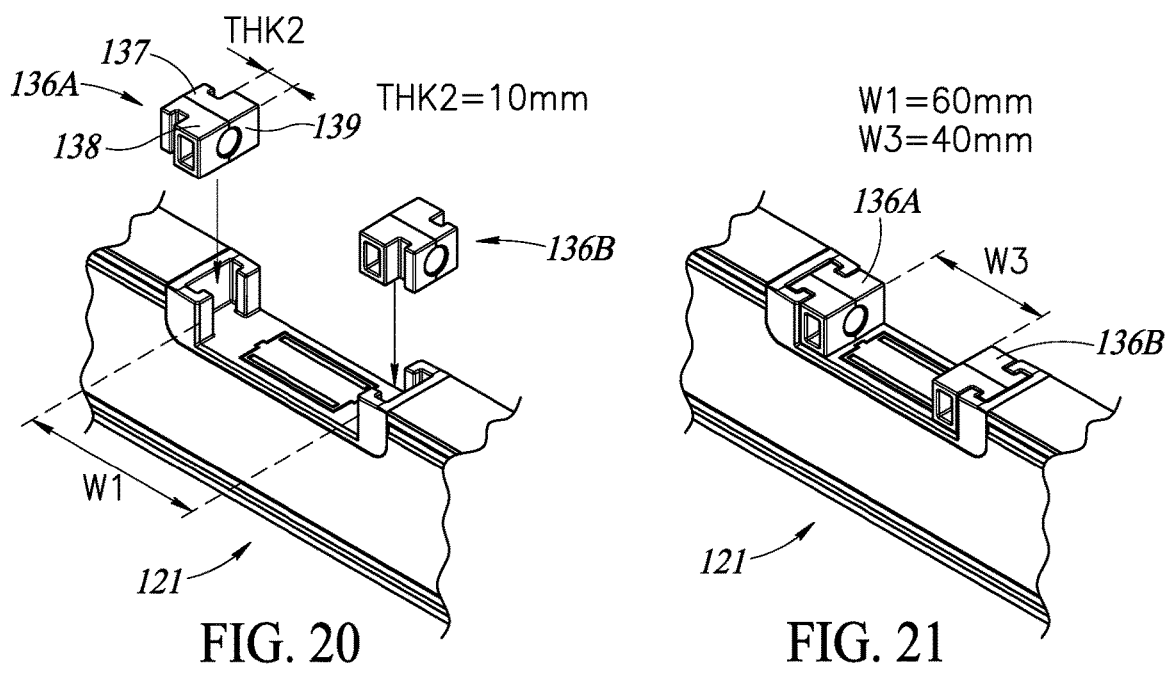
FIG. 20
FIG. 21

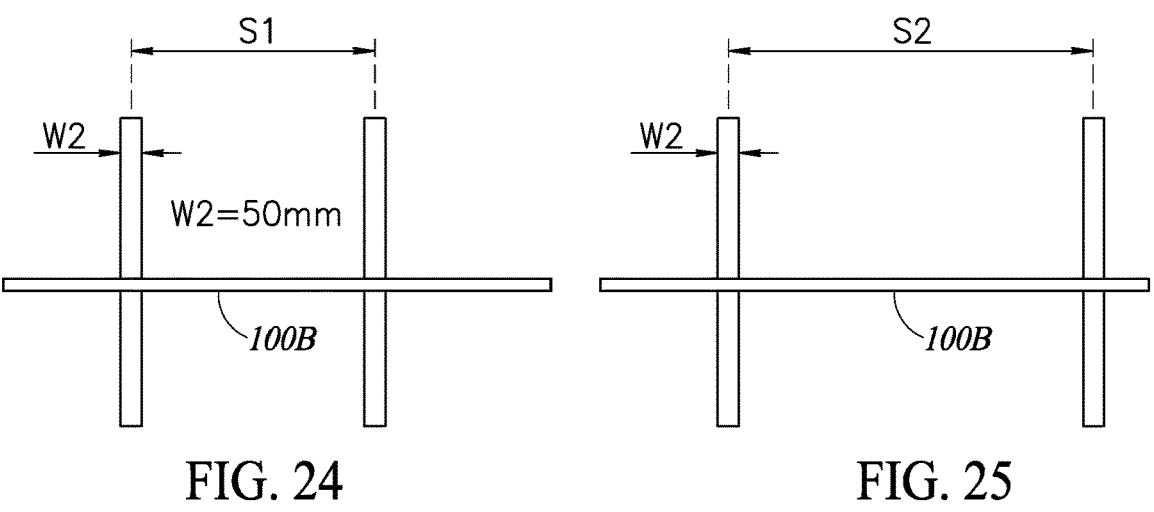
FIG. 22                    FIG. 23
FIG. 24                    FIG. 25
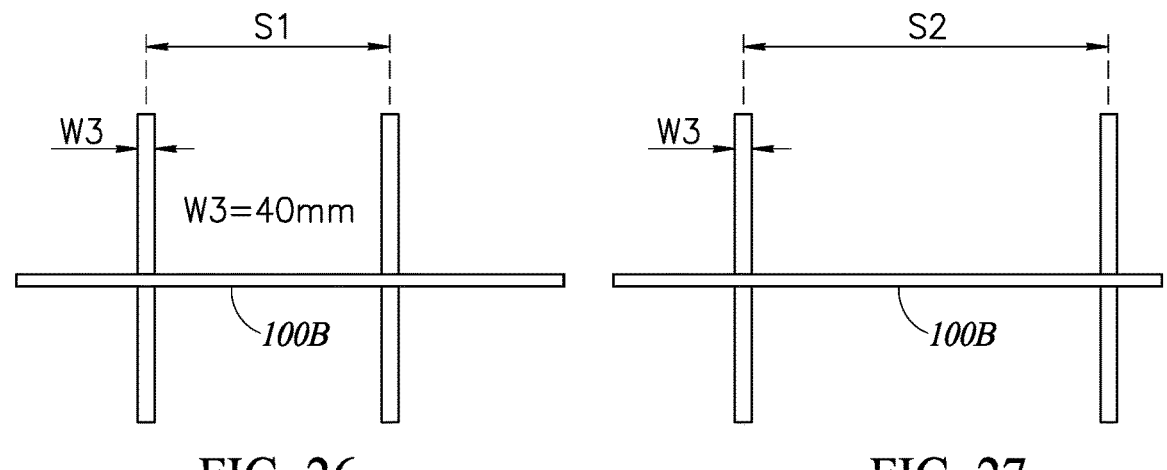
FIG. 26                    FIG. 27

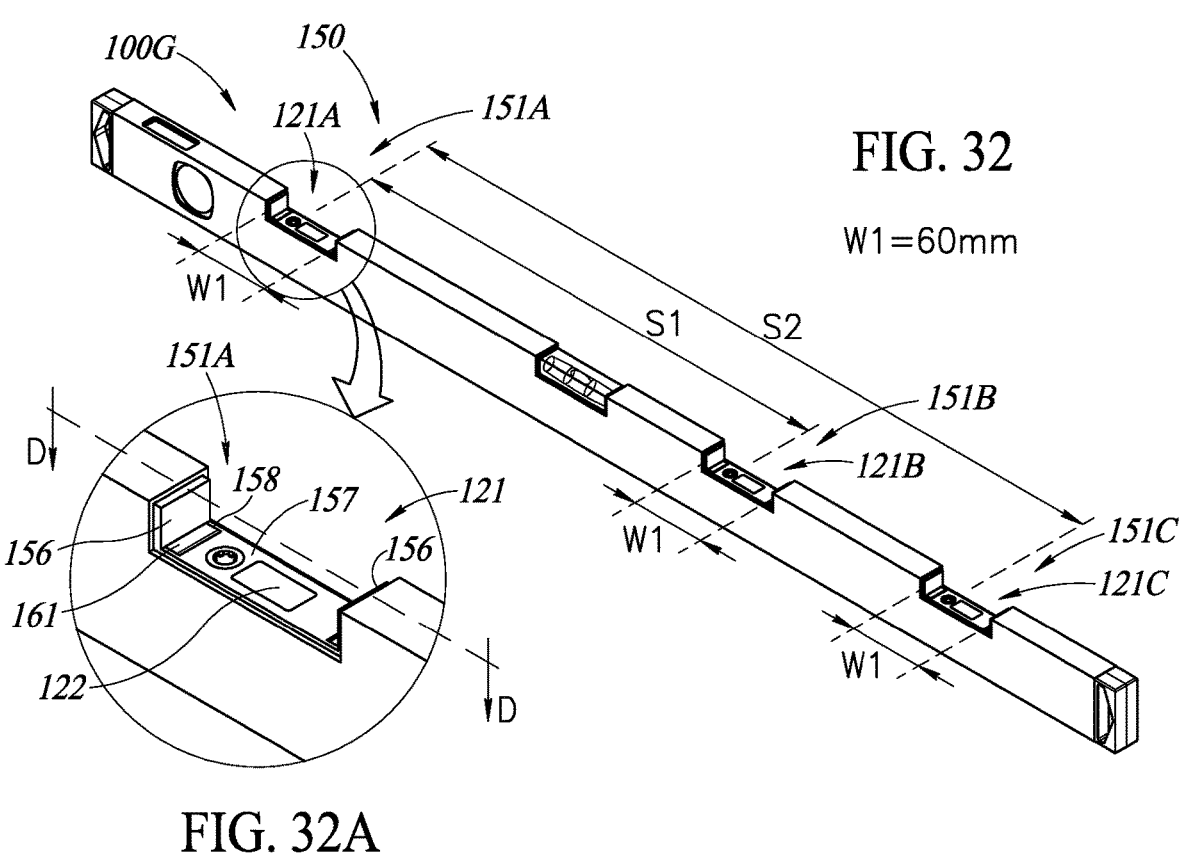
FIG. 32
W1=60mm
FIG. 32A
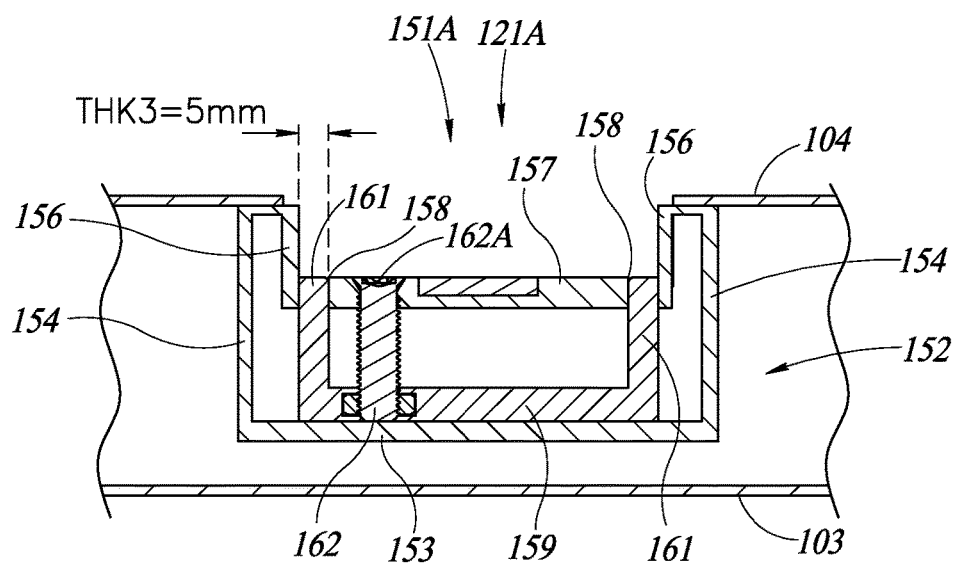
FIG. 33

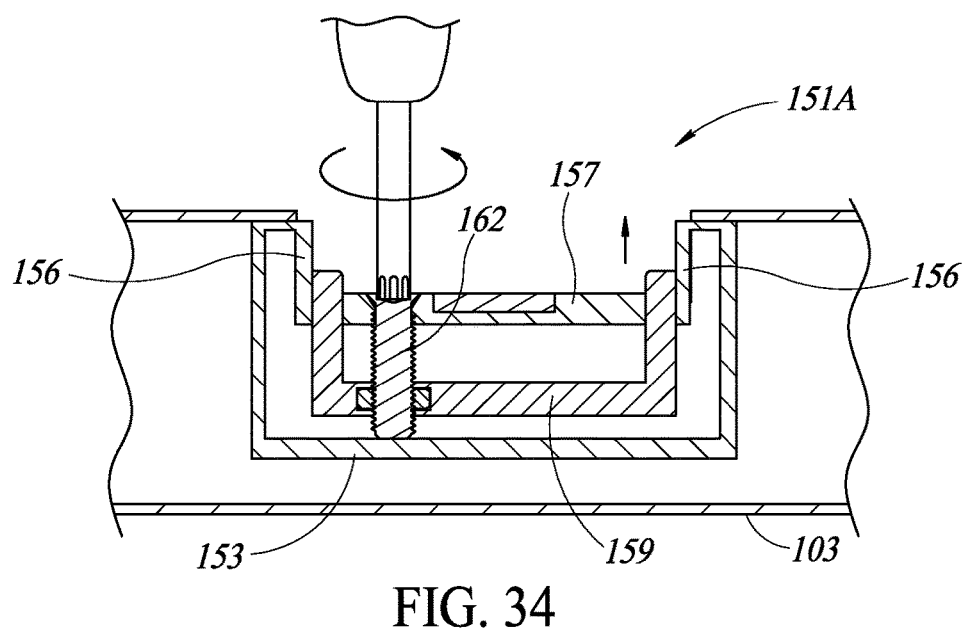
FIG. 34
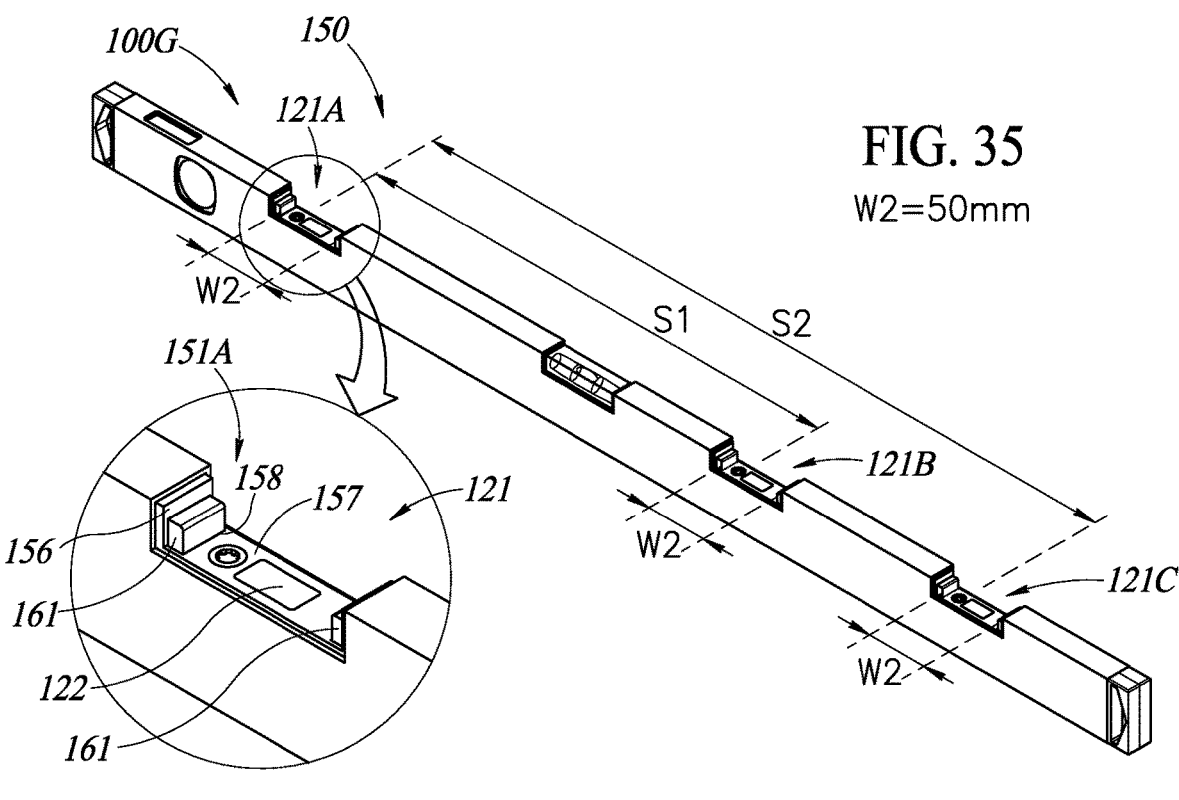
FIG. 35
W2=50mm
FIG. 35A

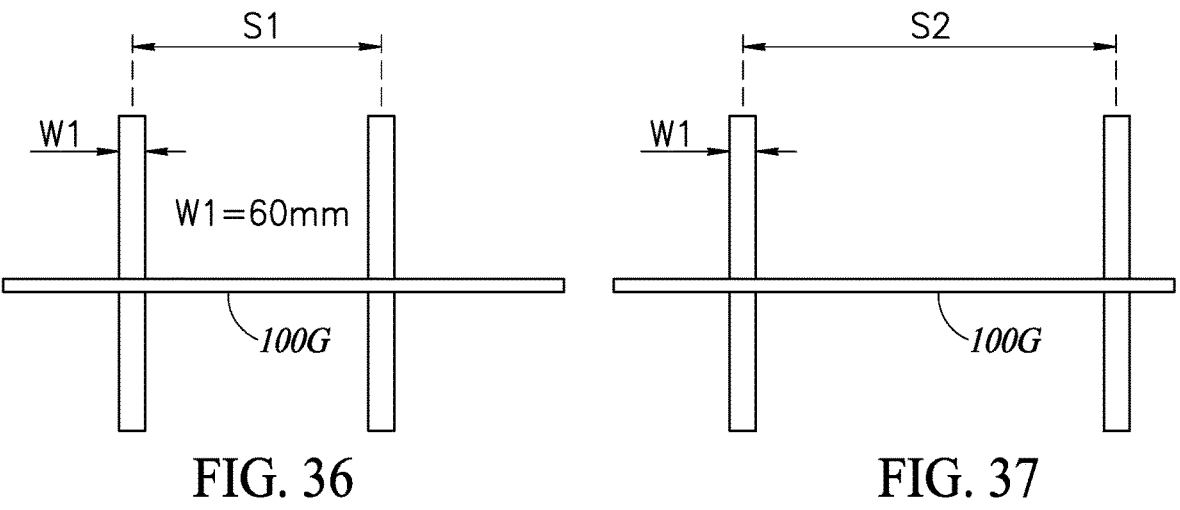
FIG. 36                    FIG. 37
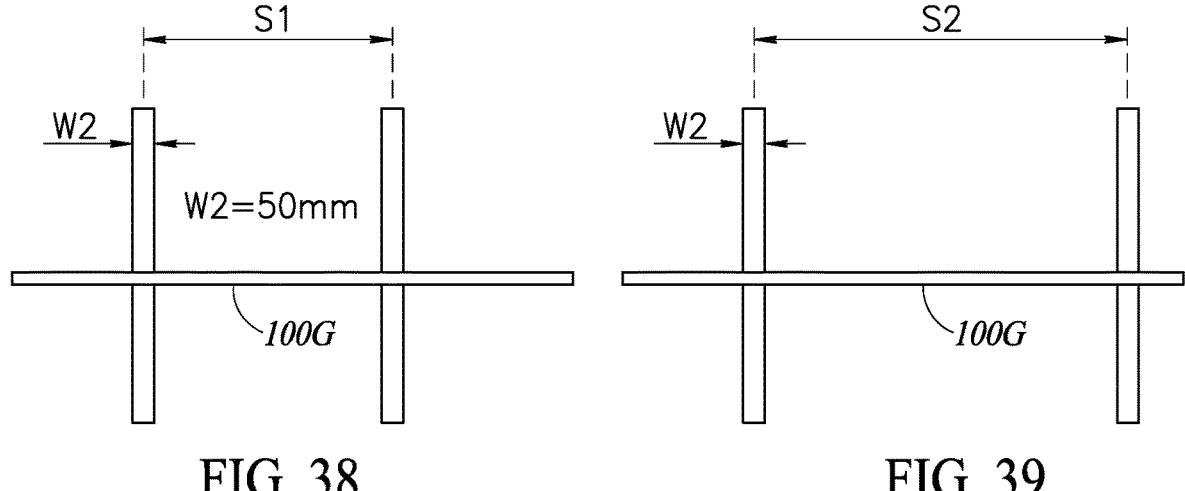
FIG. 38                    FIG. 39

MEASUREMENT DEVICE WITH INTEGRAL ANGLE FINDER

FIELD OF THE INVENTION

This invention relates to measurement devices for measuring and marking purposes, spirit levels for setting a spaced apart pair of adjacent upright studs and assist devices for use with ladders.

BACKGROUND OF THE INVENTION

Measurement devices for measuring and marking purposes include inter alia speed squares, combination squares, right angle squares, and the like. Some measurement devices have a base and an upright planar body when placing the base on a generally horizontal flat surface. The body has two parallel major body surfaces which can be equally placed on a flat surface for measuring and marking purposes. The body surfaces can have the same or different measurement markings. Some measurement devices include a bubble vial for indicating an inclination of the generally horizontal flat surface.

U.S. Pat. No. D805,928 to Ben Josef et al. shows a spirit level for setting a spaced apart pair of adjacent upright studs at either a first standard stud separation or a second standard stud separation measured between their midpoints. First and second standard stud separations are either 400 mm and 600 mm, respectively, or 417 mm and 625 mm, respectively. Upright studs can be made from steel or wood. Upright studs have one of three standard stud widths: 40 mm, 50 mm and 60 mm. The spirit level is designed for use with one standard stud width only and includes a main body having a leveling surface to be set on a generally horizontal surface and a bubble vial for providing a visual indication of an inclination of the generally horizontal surface with respect to the horizontal. The main body includes a left stud slot and a central stud slot spaced apart from the left stud slot at their midpoints at the first standard stud separation and a right stud slot spaced apart from the left stud slot at their midpoints at the second standard stud separation. The stud slots can be provided with magnets for hands free setting a spaced apart pair of adjacent upright metal studs.

Israel Standard 1847/EN 131 Part 1 entitled Ladders: Terms, types, functional sizes published November 2015 sets standards for a wide range of ladders from step ladders to extension ladders having a top reach of several meters, leaning ladders for leaning against a support in upright use, two-legged self-standing ladders, etc. Ladders include a pair of parallel stiles having rungs extending therebetween and means permanently attached to the bottoms of their parallel stiles for preventing slippage on a flat surface during upright use. Some ladders include stabilizers permanently attached to the bottoms of their parallel stiles for preventing slippage on a flat surface during upright use and also for stabilizing purposes. Some ladders have casters permanently attached to their parallel stiles for wheeling a generally horizontal ladder for assisting moving a ladder without having to lift its entire weight.

SUMMARY OF THE INVENTION

The first aspect of the present invention is directed towards measurement devices for measuring and marking purposes and including an integral angle finder for enabling two modes of use: placing either major body surface on a flat surface or setting a base on an inclined surface for indicating its inclination. The measurement devices are intended to provide additional angle finding capability in a convenient and compact manner without detracting from conventional use. The measurement devices can be formed from suitable metal and/or plastic materials.

The second aspect of the present invention is directed towards spirit levels for setting a spaced apart pair of adjacent upright studs of more than one standard stud width at a standard stud separation between the midpoints of spaced apart pair or upright studs. The spirit levels include stud slots having the longest 60 mm standard stud width and a stud slot reduction arrangement for reversibly shortening the longest 60 mm standard stud slot width to a shorter standard stud width. The spirit levels preferably store a stud slot reduction arrangement when not deployed for shortening stud slot widths. The stud slot reduction arrangements preferably include a set of stud slot reducers which are slidingly inserted into stud slots for reducing their stud slot width and slidingly removed therefrom for restoring their stud slot width to their non-shortened stud slot width. Spirit levels can be configured for setting a single spaced apart pair of upright studs or multiple spaced apart pairs of upright studs.

One stud slot reduction arrangement includes a set of discrete stud slot reducers configured for preferably downward sliding insertion into stud slots in a front elevation view of a spirit level for shortening their stud slot widths. The stud slot widths are preferably shortened by the insertion of a pair of stud slot reducers as opposed to a single stud slot reducer. A spirit level preferably includes a stud slot reducer storage magazine configured for storing its set of discrete stud slot reducers when not in use. Another stud slot reduction arrangement includes a set of screw-operated stud slot reduction mechanisms each having a stud slot reducer configured for repeatedly selectively deployable between a storage position and a stud slot reduction position. The stud slot reducers preferably undergo a linear displacement between their storage position and their stud slot reduction position.

The third aspect of the present invention is directed towards a caster device pair for use with a ladder having a stabilizer for enabling wheeling the ladder while being held generally horizontal by a user for assisting moving the ladder without having to lift its entire weight. The caster device pair can also assist in loading and unloading a ladder onto a vehicle for transportation purposes. The caster device pair is designed to be securely assembled on a stabilizer in such a manner that the caster device pair does not interfere with upright use of a ladder. The caster device pair is universal insofar that it can be readily assembled on a wide range of leaning and self-standing ladders. The leaning and self-standing ladders can have single extensions or multiple extensions. The ladders can be made from wood, aluminum, etc.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which:

FIG. 18 is a pictorial view showing a pair of 5 mm thick stud slot reducers for shortening a stud slot width from an original 60 mm stud slot width to a 50 mm stud slot width;

FIG. 19 is a pictorial view showing the 50 mm wide stud slot;

FIG. 20 is a pictorial view showing a pair of 10 mm thick stud slot reducers for shortening a stud slot from an original 60 mm stud slot width to a 40 mm stud slot width;

FIG. 21 is a pictorial view showing the 40 mm wide stud slot;

FIG. 22 is a schematic front elevation view showing the use of the FIG. 16 spirit level for setting a spaced apart pair of adjacent upright studs of 60 mm standard stud width at the standard stud separation S1=400 mm;

FIG. 23 is a schematic front elevation view showing the use of the FIG. 16 spirit level for setting a spaced apart pair of adjacent upright studs of 60 mm standard stud width at the standard stud separation S2=600 mm;

FIG. 24 is a schematic front elevation view showing the use of the FIG. 16 spirit level for setting a spaced apart pair of adjacent upright studs of 50 mm standard stud width at the standard stud separation S1=400 mm;

FIG. 25 is a schematic front elevation view showing the use of the FIG. 16 spirit level for setting a spaced apart pair of adjacent upright studs of 50 mm standard stud width at the standard stud separation S2=600 mm;

FIG. 26 is a schematic front elevation view showing the use of the FIG. 16 spirit level for setting a spaced apart pair of adjacent upright studs of 40 mm standard stud width at the standard stud separation S1=400 mm;

FIG. 27 is a schematic front elevation view showing the use of the FIG. 16 spirit level for setting a spaced apart pair of adjacent upright studs of 40 mm standard stud width at the standard stud separation S2=600 mm;

FIG. 32 is a pictorial view of a spirit level with an alternative stud slot reduction arrangement with stud slot reduction mechanisms for setting a spaced apart pair of adjacent upright studs of 60 mm standard stud width at either a first standard stud separation or a second standard stud separation;

FIG. 32A is a close-up view of the FIG. 32 spirit level's left stud slot;

FIG. 33 is a cross section of a FIG. 32A stud slot along line D-D in FIG. 32A showing its screw-operated stud slot reduction mechanism including a stud slot reducer;

FIG. 34 is a pictorial view showing operation of the FIG. 32 stud slot reduction mechanism for elevating its stud slot reducer from a storage position to a stud slot reduction position;

FIG. 35 is a pictorial view of the FIG. 32 spirit level for setting a spaced apart pair of adjacent upright studs of 50 mm standard stud width;

FIG. 35A is a close-up view of the FIG. 32 spirit level's left stud slot;

FIG. 36 is a schematic front elevation view showing the use of the FIG. 32 spirit level for setting a spaced apart pair of adjacent upright studs of 60 mm standard stud width at the standard stud separation S1=400 mm;

FIG. 37 is a schematic front elevation view showing the use of the FIG. 32 spirit level for setting a spaced apart pair of adjacent upright studs of 60 mm standard stud width at the standard stud separation S2=600 mm;

FIG. 38 is a schematic front elevation view showing the use of the FIG. 32 spirit level for setting a spaced apart pair of adjacent upright studs of 50 mm standard stud width at the standard stud separation S1=400 mm;

FIG. 39 is a schematic front elevation view showing the use of FIG. 32 spirit level for setting a spaced apart pair of adjacent upright studs of 50 mm standard stud width at the standard stud separation S2=600;

DETAILED DESCRIPTION OF THE DRAWINGS

The present description is divided into three sections as follows:

Section 1: Measurement devices with integral angle finder

Figures 1, 2:
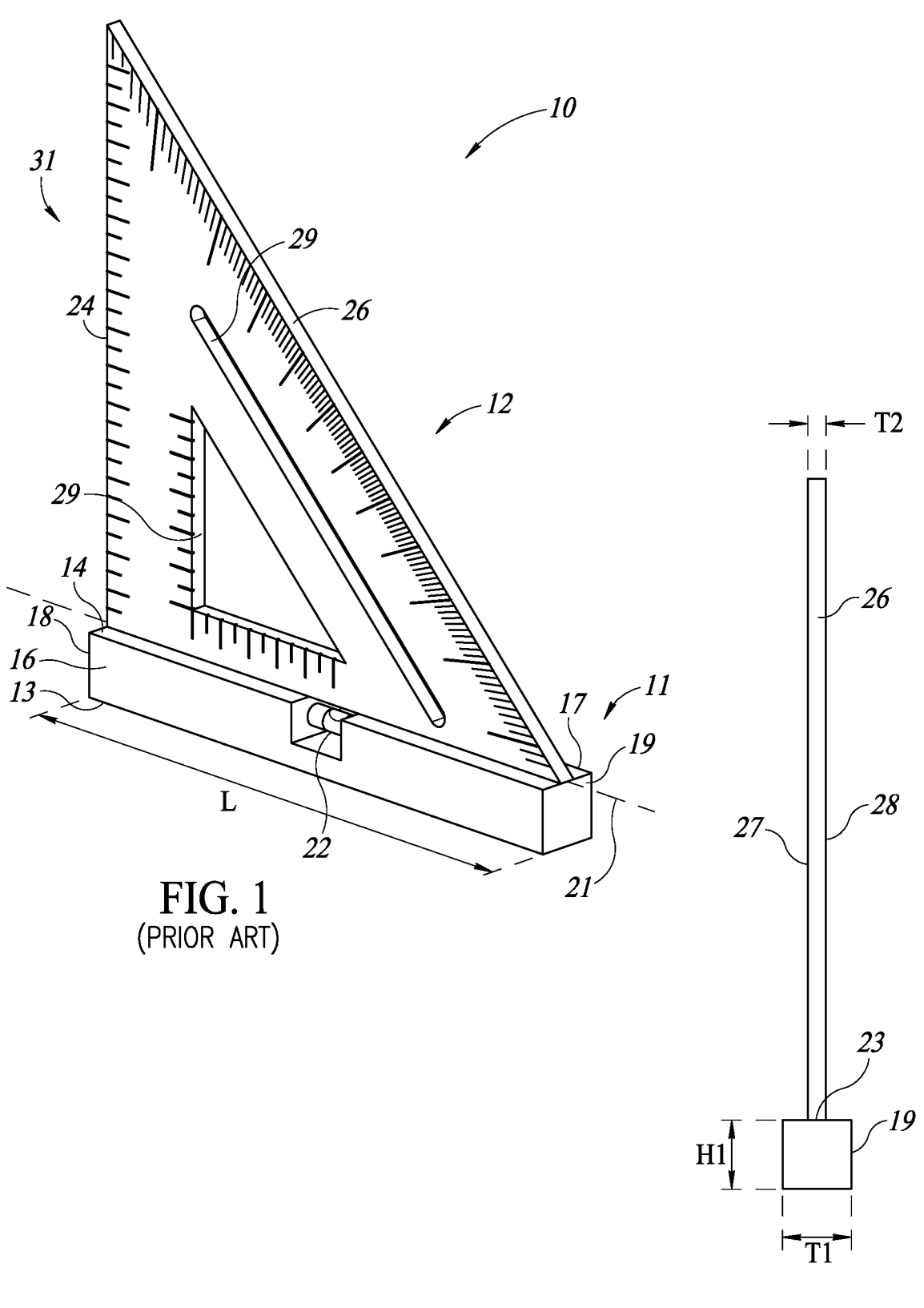
FIG. 1 is a front perspective view of a conventional speed square with a base and a triangular shaped body.
FIG. 2 is a side elevation view of the speed square showing thicknesses of its base and triangular shaped body.

Section 2: Spirit levels for setting a spaced apart pair of adjacent upright studs Section 3: Castor device pair for use with ladders Section 1: Measurement Devices with Integral Angle Finder FIG. 1 and FIG. 2 show a conventional speed square 10 including a base 11 and a generally triangular planar body 12. The base 11 has a base setting surface 13 for placing on a generally horizontal flat surface, a base top surface 14 opposite the base setting surface 13, a base front surface 16, a base rear surface 17 opposite the base front surface 16, a base left end surface 18 and a base right end surface 19 opposite the base left end surface 18. The base top surface 14 has a central longitudinal centerline 21. The base 11 has the following dimensions: length L, thickness T1, and height H1. The base 11 includes a bubble vial 22 for indicating an inclination of a generally horizontal flat surface on placing the base setting surface 13 thereon.

The body 12 includes a first edge 23, a second edge 24 and a hypotenuse edge 26. The body 12 has a thickness T2 where T1>T2. The first edge 23 is mounted on the central longitudinal centerline 21 such that the body 12 stands upright on the base 11 placed on a generally horizontal flat surface. The body 12 has a first major body surface 27 and a second major body surface 28. The body 12 includes one or more throughgoing apertures 29 between the first major body surface 27 and the second major body surface 28 and measurement markings 31 adjacent the throughgoing apertures 29 and along the second edge 24 and the hypotenuse edge 26.

Figure 3:
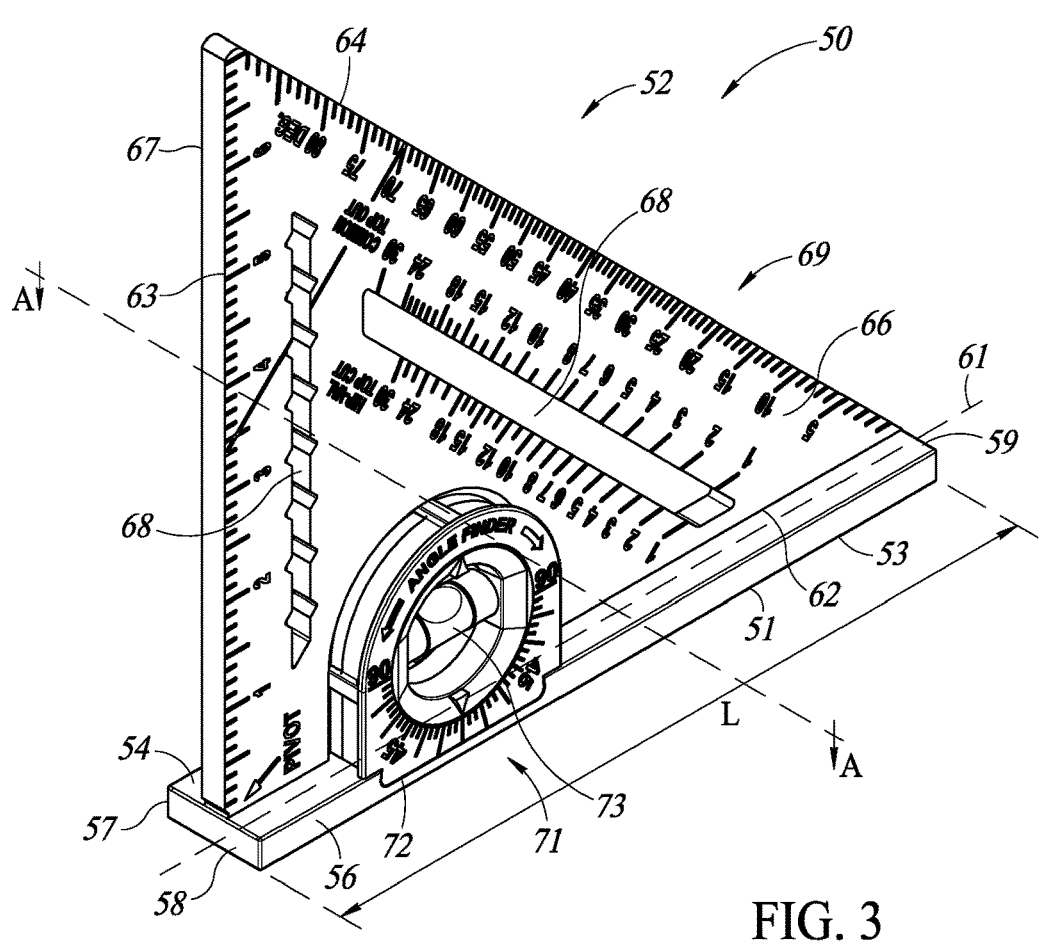
FIG. 3 is a front perspective view of a measurement device configured as a speed square in accordance with the present invention.
Figure 4:
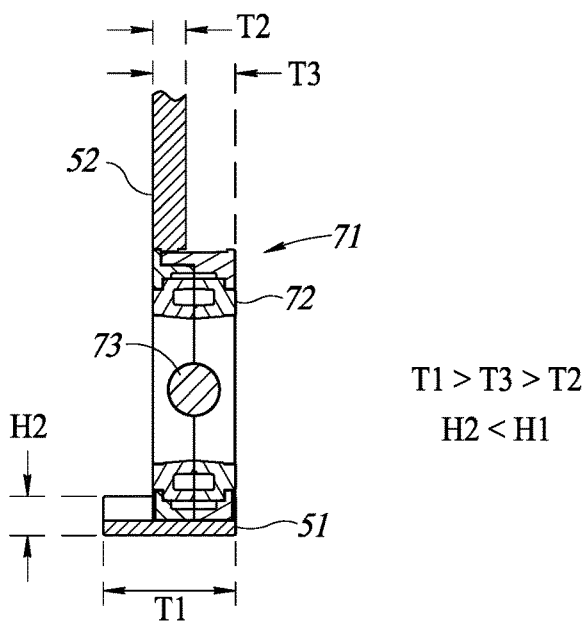
FIG. 4 is a partial cross section of the FIG. 3 speed square along line A-A thereon.
Figure 5:
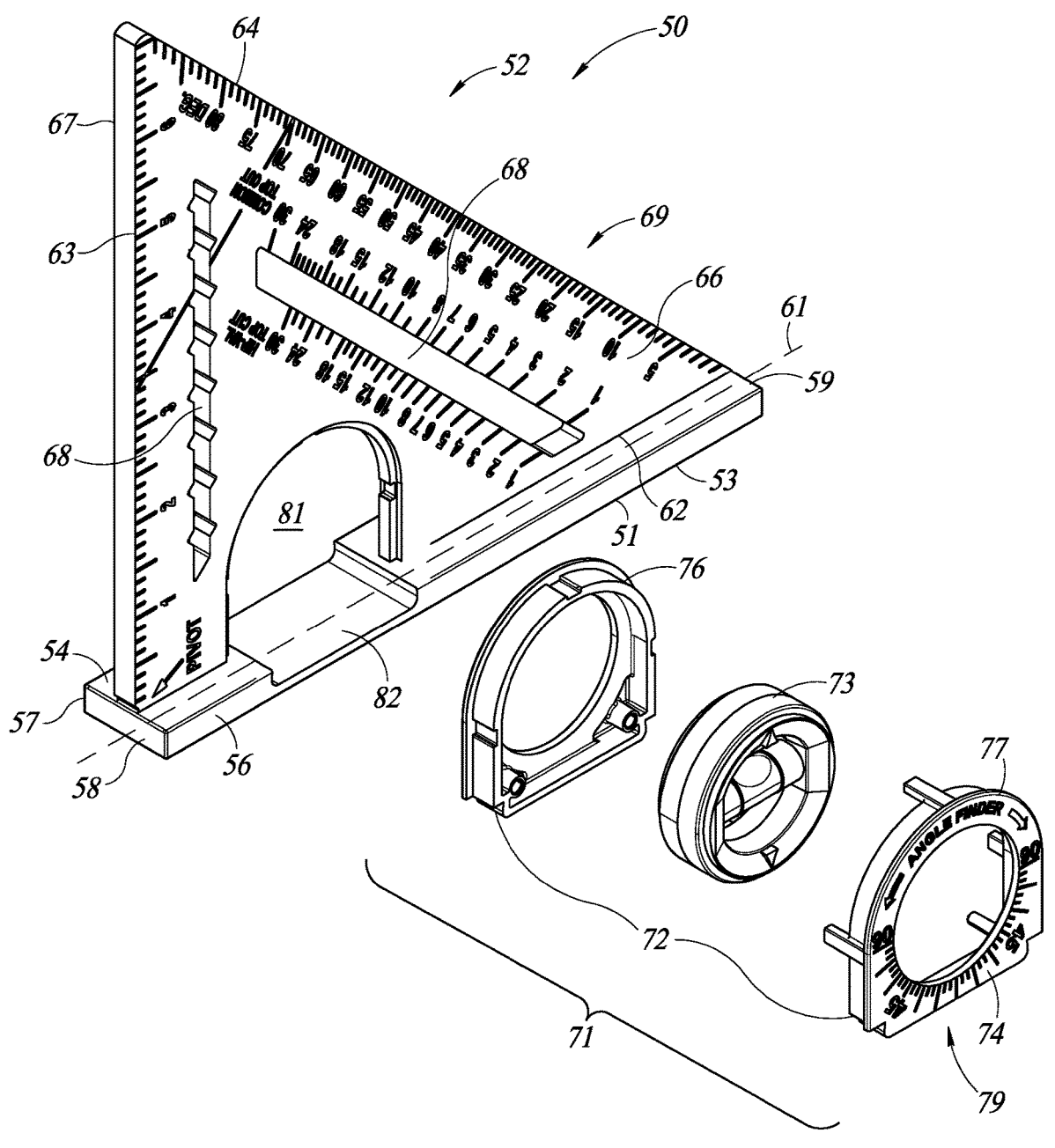
FIG. 5 is an exploded view of the FIG. 3 speed square.

FIG. 3 to FIG. 5 show a measurement device 50 configured as a speed square including a base 51 and a generally triangular planar body 52. The base 51 has a base setting surface 53 for placing on a generally horizontal flat surface, a base top surface 54 opposite the base setting surface 53, a base front surface 56, a base rear surface 57 opposite the base front surface 56, a base left end surface 58 and a base right end surface 59 opposite the base left end surface 58. The base 51 has the same length L and thickness T1 as the base 11 but has a lower height H2 affording a more compact design. The base top surface 54 has a central longitudinal centerline 61.

The body 52 includes a first edge 62, a second edge 63 and a hypotenuse edge 64 and has the same thickness T2 as the body 12. The first edge 62 is mounted on the central longitudinal centerline 61 such that the body 52 stands upright on the base 51 placed on a generally horizontal flat surface. The body 52 has a first major body surface 66 and a second major body surface 67. The body 52 includes one or more throughgoing apertures 68 and measurement markings 69 adjacent the throughgoing apertures 68 and along the second edge 63 and the hypotenuse edge 64.

The speed square 50 includes an integral angle finder 71 slidingly mounted therein in a transverse direction with respect to the central longitudinal centerline 61. The angle finder 71 includes an angle finder housing 72 mounted in the measurement device 50 and a bubble vial 73 rotatably mounted therein. The angle finder housing 72 includes a first angle finder housing component 74 and a second angle finder housing component 76 for snap fitting on the first angle finder housing component 74 for entrapping the bubble vial 73 therebetween. The angle finder housing 72 has a first major angle finder housing surface 77 parallel with the first major body surface 66 and a second major angle finder housing surface 78 parallel with the second major body surface 67. The first major angle finder housing surface 77 and the second major angle finder housing surface 78 have angular markings 79 for indicating an angle of the bubble vial 73 with respect to the base setting surface 53. The angle finder housing 72 has a thickness T3 in a side elevation view of the measurement device 50 facing either the second edge 63 or the hypotenuse edge 64 where T1>T3>T2.

The speed square 50 includes a generally arch shaped angle finder aperture 81 between the first major body surface 66 and the second major body surface 67 and an angle finder channel 82 between the base front surface 56 and the base rear surface 57. The angle finder aperture 81 is continuous with the angle finder channel 82 such that the angle finder 71 is slidingly mounted in both the base 51 and the body 52.

Figure 6:
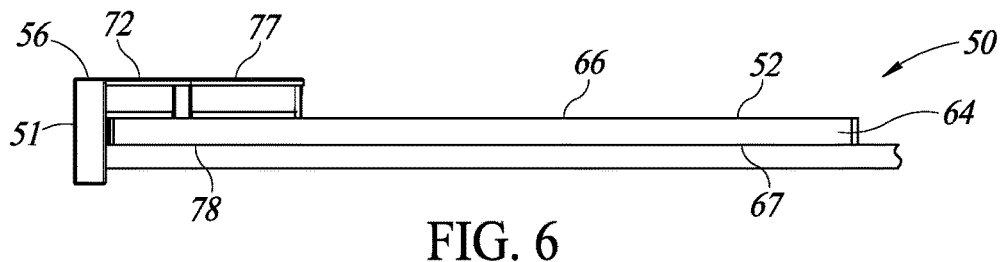
FIG. 6 is a front elevation view showing use of the FIG. 3 speed square with its first major body surface placed on a flat surface.
Figure 7:
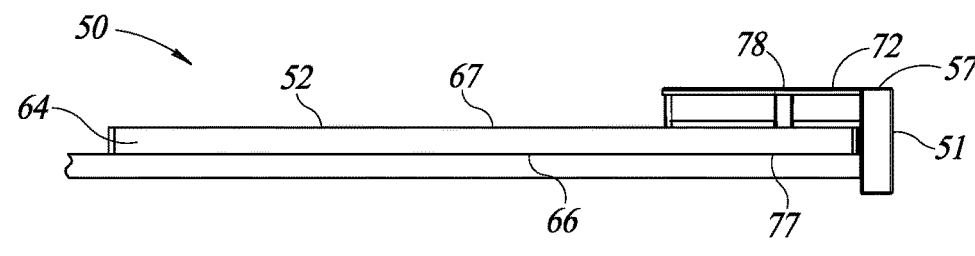
FIG. 7 is a front elevation view showing use of the FIG. 3 speed square with its second major body surface placed on a flat surface.
Figure 8:
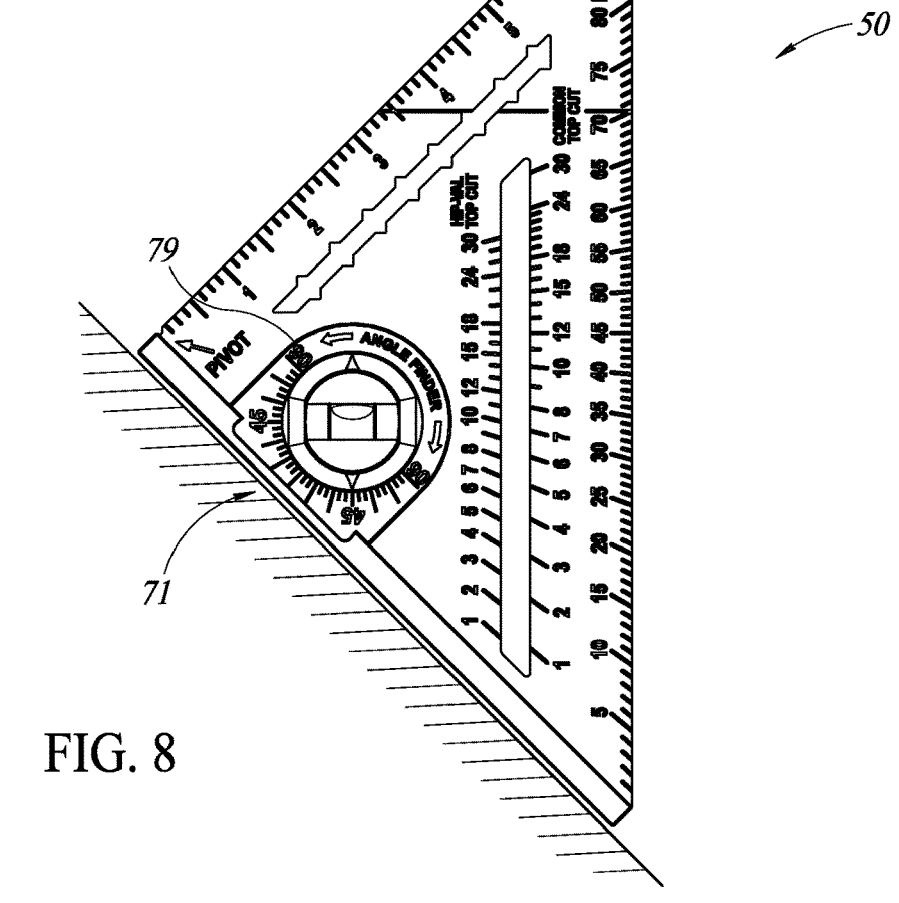
FIG. 8 is a front perspective view showing use of the FIG. 3 speed square for measuring an inclination of an inclined surface.

FIG. 6 to FIG. 8 show use of the speed square 50 as follows: FIG. 6 and FIG. 7 show that the angle finder 71 enables equal use of the first major body surface 66 and the second major body surface 67 for measuring and marking purposes.

FIG. 6 shows for using the first major body surface 66 for measuring and marking purposes on a flat surface, a user urges the downward protruding length of the base 51 to abut against the flat surface's edge and depresses the second major body surface 67 on the flat surface causing the second major angle finder housing surface 78 to be flush with the second major body surface 67 and the first major angle finder housing surface 77 to protrude from the first major body surface 66. The angle finder 71's thickness T3 is preferably dimensioned such that the first major angle finder surface 77 is flush with the base front surface 56.

FIG. 7 shows for using the second major body surface 67 for measuring and marking purposes on a flat surface, a user urges the downward protruding length of the base 51 to abut against the flat surface's edge and depresses the first major body surface 66 on the flat surface causing the first major angle finder housing surface 77 to be flush with the first major body surface 66 and the second major angle finder housing surface 78 to protrude from the second major body surface 67. The angle finder 71's thickness T3 is dimensioned such that second major angle finder surface 78 is flush with the base rear surface 57.

FIG. 8 shows use of the speed square 50 for measuring an inclination of an inclined surface.

Figures 9, 10:
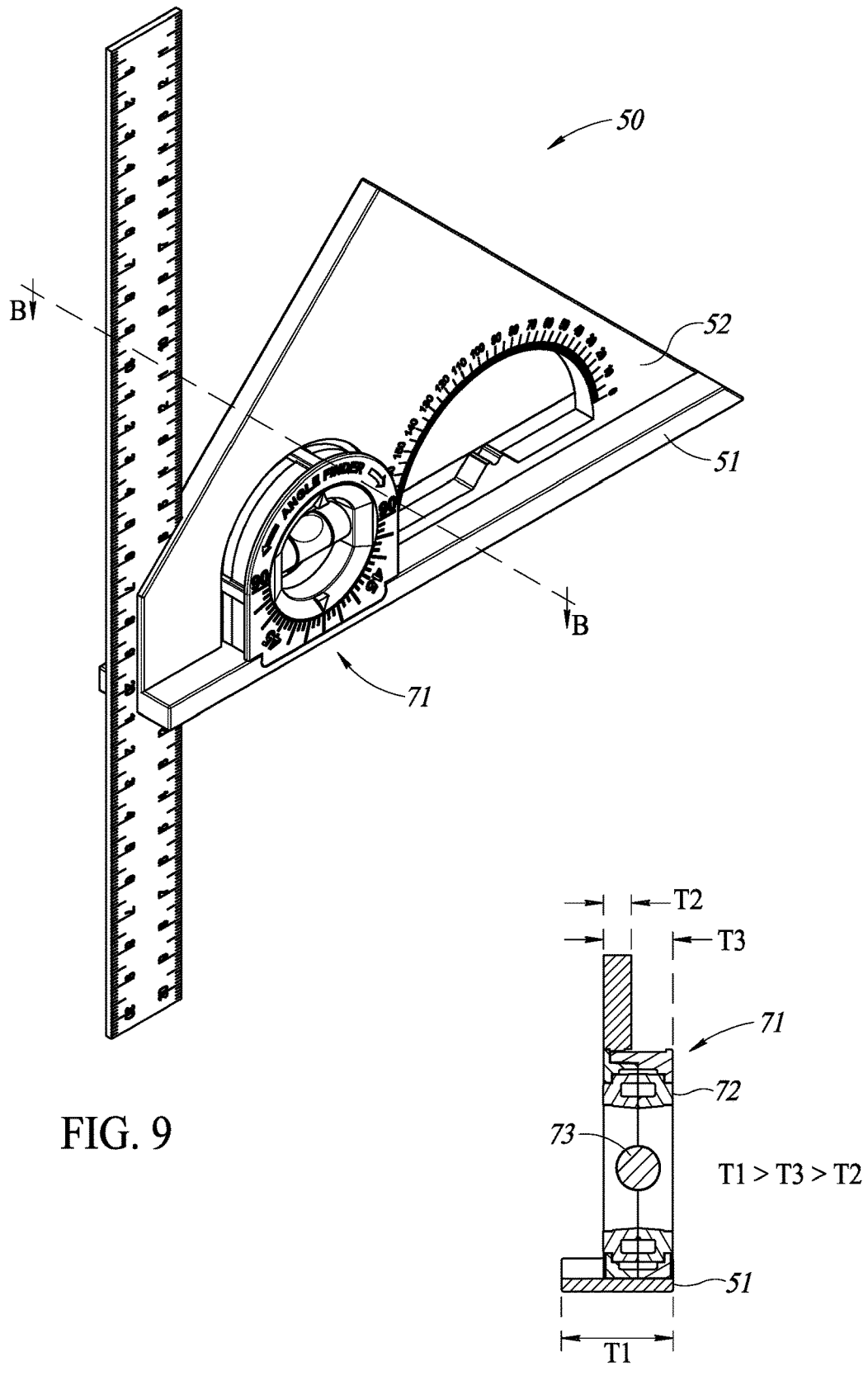
FIG. 9 is a front perspective view of a measurement device configured as a combination square in accordance with the present invention.
FIG. 10 is a partial cross section of the combination square along line B-B on FIG. 9.

FIG. 9 and FIG. 10 show a measurement device 50 configured as a combination square including an integral angle finder 71. The combination square 50 can be placed on either its major body surfaces on a flat surface for measuring and marking purposes or its base setting surface on an inclined surface for indicating its inclination.

Figure 11:
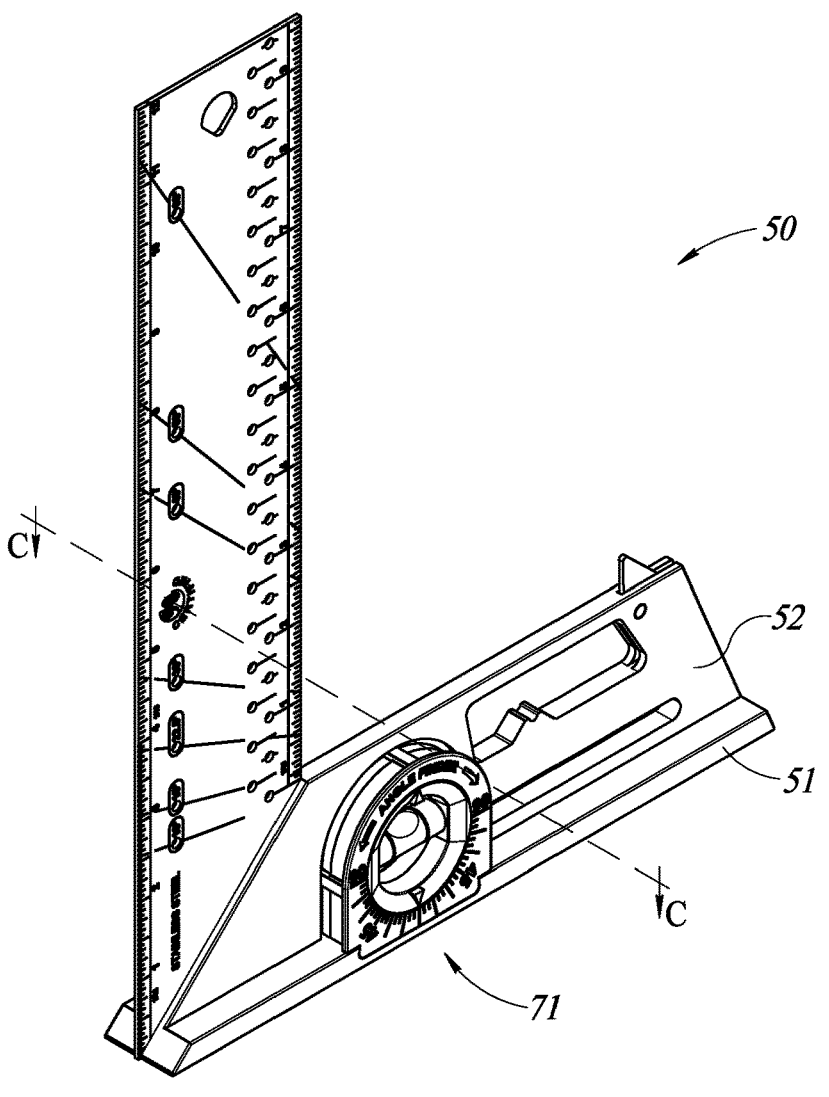
FIG. 11 is a front perspective view of a measurement device configured as a right-angle square in accordance with the present invention.
Figure 12:
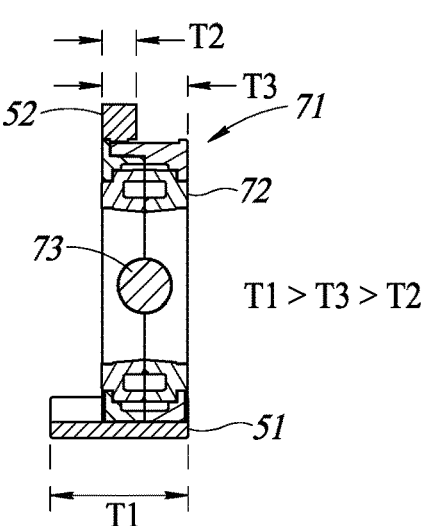
FIG. 12 is a partial cross section of the right-angle square along line C-C on FIG. 11.

FIG. 11 and FIG. 12 show a measurement device 50 configured as a right-angle square including an integral angle finder 71. The right-angle square 50 can be placed on either its major body surfaces on a flat surface for measuring and marking purposes or its base setting surface on an inclined surface for indicating its inclination.

Figures 13, 14, 15:
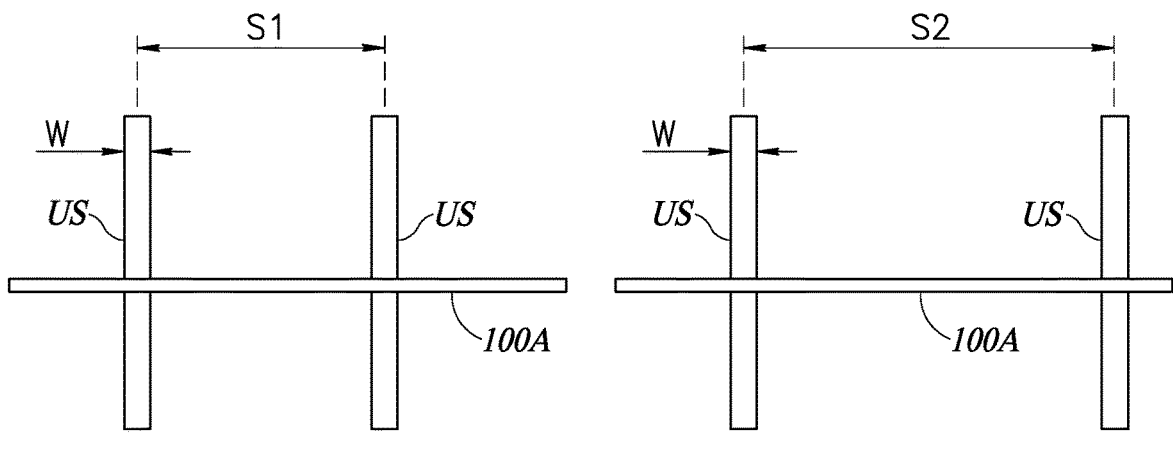
FIG. 13 is a pictorial view of a conventional spirit level for setting a first spaced apart pair of adjacent upright studs at a first standard stud separation between their midpoints and a second spaced apart pair of adjacent upright studs at a second standard stud separation between their midpoints.
FIG. 14 is a schematic front elevation view showing the use of the FIG. 13 spirit level for setting the first spaced apart pair of adjacent upright studs.
FIG. 15 is a schematic front elevation view showing the use of the FIG. 13 spirit level for setting the second spaced apart pair of adjacent upright studs.
Figures 16, 16A, 16B, 17:
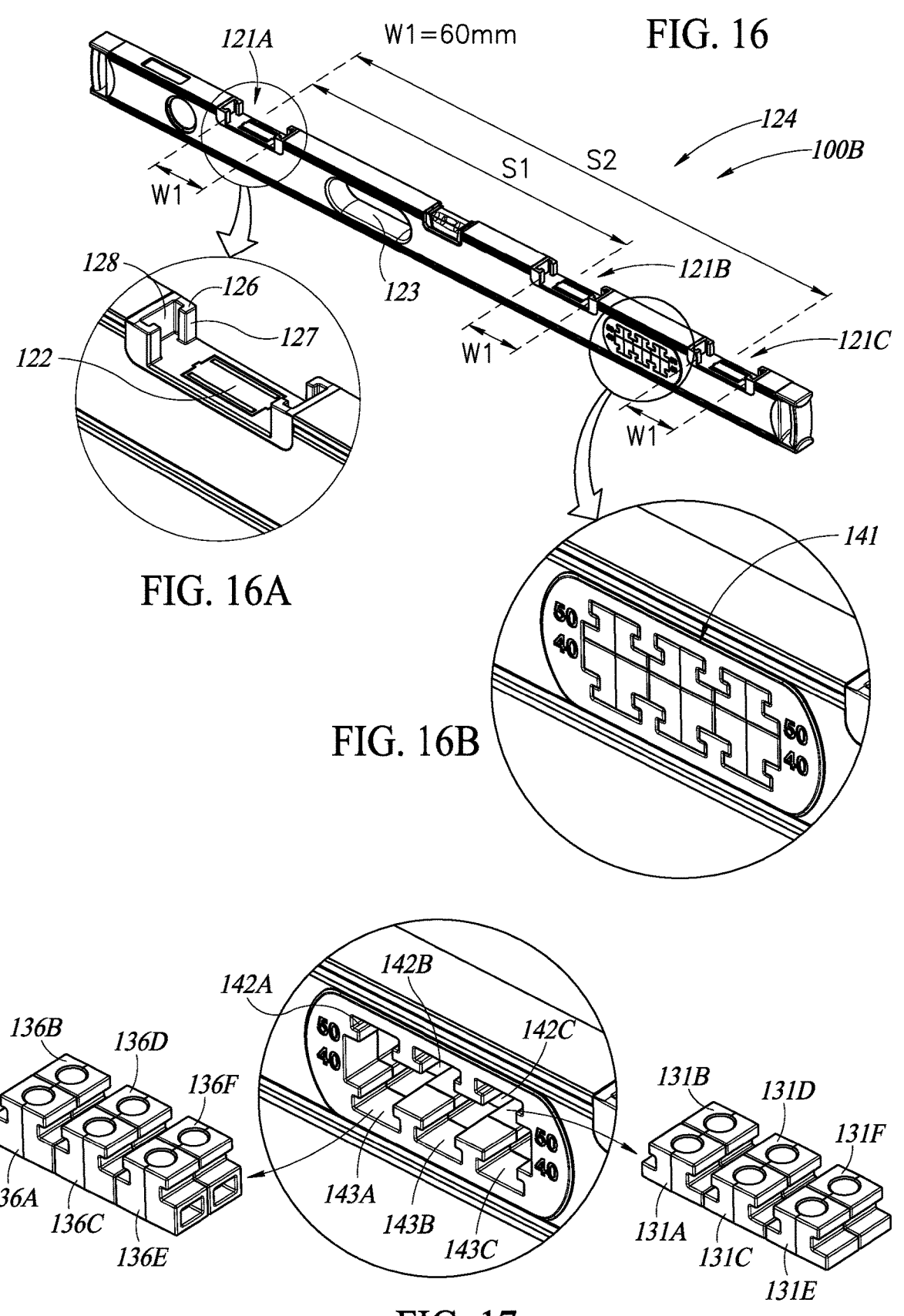
FIG. 16 is a pictorial view of a spirit level with a stud slot reduction arrangement with discrete stud slot reducers for setting a spaced apart pair of adjacent upright studs of 60 mm standard stud width at either a first standard stud separation or a second standard stud separation.
FIG. 16A is a close-up view of the FIG. 16 spirit level's left stud slot.
FIG. 16B is a close-up view of a section of the FIG. 16 spirit level including a stud slot reducer storage magazine for storing two sets of three pairs of stud slot reducers when not in use.
FIG. 17 is a close-up view of the stud slot reducer storage magazine after removal of the two sets of three pairs of stud slot reducers.

Section 2: Spirit Levels for Setting a Spaced Apart Pair of Adjacent Upright Studs FIG. 13 to FIG. 15 show a spirit level 100A for setting a spaced apart pair of adjacent upright studs US of one of the three standard stud widths: W=40 mm or W=50 mm or W=60 mm at either a first standard stud separation S1 or a second standard stud separation S2 measured between their midpoints. The standard stud separations S1 and S2 are 400 mm and 600 mm, respectively, or 417 mm and 625 mm, respectively. The upright studs US can be made from steel or wood.

The spirit level 100A has a longitudinal level centerline 101 and includes a box cross section main body 102 having a leveling surface 103 to be set on a horizontal surface, an uppermost surface 104 opposite the leveling surface 103, a front major surface 106 and a rear major surface 107 opposite the front major surface 106.

The spirit level 100A has a bubble vial 108 for providing a visual indication of an inclination of a generally horizontal surface with respect to the horizontal and a bubble vial 109 for providing a visual indication of an inclination of a generally vertical surface with respect to the vertical.

The main body 102 includes a left stud slot 111A, a central stud slot 111B and a right stud slot 111C spaced apart therealong. The stud slots 111A-111C have an internal stud slot width W of one of the three standard stud widths, namely, the shortest 40 mm standard stud slot width, the middle length 50 mm standard stud slot width and the longest 60 mm standard stud slot width.

The stud slot 111B is spaced apart from the stud slot 111A at their midpoints at the standard stud separation S1. The stud slot 111C is spaced apart from the stud slot 111A at their midpoints at the standard stud separation S2.

The stud slots 111A-111C are provided with magnets for hands free setting a spaced apart pair of adjacent upright metal studs.

Use of a spirit level 100A includes selecting a spirit level 100A such its stud slots 111 are sized for snugly accommo-dating selected uprights studs, namely, a spirit level 100A with 40 mm wide stud slots 111 is selected for setting 40 mm wide upright studs, a spirit level 100A with 50 mm wide stud slots 111 is selected for setting 50 mm wide upright studs US, and a spirit level 100A with 60 mm wide stud slots 111 is selected for setting 60 mm wide upright studs.

Spirit Level with Discrete Stud Slot Reducers

FIG. 16 to FIG. 21 show a spirit level 100B for setting a spaced apart pair of adjacent upright studs of any standard stud width of the 40 mm, 50 mm and 60 mm standard stud widths at either the standard stud separation S1=400 mm or 417 mm or the standard stud separation S2=600 mm or 625 mm. The spirit level 100B has a similar construction as the spirit level 100A and therefore similar parts are likewise numbered. The spirit level 100B includes stud slots 121A-121C corresponding to the stud slots 111A-111C. The stud slots 121 are each provided with a magnet 122 for hands free use of the spirit level 100B for setting metal upright studs. The spirit level 100B is provided with a handgrip 123 for facilitating handling.

The spirit level 100B has a stud slot reduction arrange-ment 124 including an opposite pair of stud slot reducer supports 126 fitted in each stud slot 121. The opposite pair of stud slot reducer supports 126 have an opposite pair of transverse stud slot reducer support surfaces 127 limiting a stud slot width W1=60 mm for enabling the spirit level 100B to be used for setting a spaced apart pair of adjacent 60 mm wide upright studs at either the standard stud separation S1 or the standard stud separation S2. The opposite pair of stud slot reducer supports 126 each include a T-shaped slot 128 facing towards one another in a top plan view of the spirit level 100B.

The stud slot reduction arrangement 124 includes a first set of three pairs of discrete stud slot reducers 131A-131F for shortening the stud slots 121A-121C for use with 50 mm wide upright studs. The discrete stud slot reducers 131A-131F are intended for downward sliding insertion into their respective stud slots 121 and upward sliding removal there-from in a front elevation view of the spirit level 100B. Each discrete stud slot reducer 131 includes a trailing discrete stud slot reducer section 132 for insertion in a T-shaped slot 128 and a leading discrete stud slot reducer section 133 for protruding from the T-shaped slot 128. The leading discrete stud slot reducer section 133 has a thickness THK1=5 mm and a transverse leading stud slot reducer surface 134 such that the stud slots 121 each have a stud slot width W2=50 mm on sliding insertion of stud slot reducer pairs 131A and 131B, 131C and 131D, and 131E and 131F thereinto, respectively.

The stud slot reduction arrangement 124 includes a sec-ond set of three pairs of discrete stud slot reducers 136A-136F for shortening the stud slots 121A-121C for use with 40 mm wide upright studs. Each discrete stud slot reducer 136 includes a trailing discrete stud slot reducer section 137 for insertion in a T-shaped slot 128 and a leading discrete stud slot reducer section 138 for protruding from the T-shaped slot 128. The leading discrete stud slot reducer section 138 has a thickness THK2=10 mm and a transverse leading stud slot reducer surface 139 such that the stud slots 121A-121C each have a stud slot width W3=40 mm on sliding insertion of discrete stud slot reducer pairs 136A and 136B, 136C and 136D, and 136E and 136F thereinto, respectively.

The main body 102 includes a stud slot reducer storage magazine 141 for storing the first set of three pairs of discrete stud slot reducers 131A-131F and the second set of three pairs of discrete stud slot reducers 136A-136F when not in use. The stud slot reducer storage magazine 141 is configured with an upper row of three inverted T-shaped slots 142A, 142B and 142C and a lower row of three T-shaped slots 143A, 143B and 143C. The upper row of three inverted T-shaped slots 142A, 142B and 142C and the lower row of three T-shaped slots 143A, 143B and 143C meet to form continuous throughgoing apertures. The upper row of three inverted T-shaped slots 142A, 142B and 142C and the lower row of three T-shaped slots 143A, 143B and 143C extend widthwise through the main body 102.

Each T-shaped slot 142 is configured for sidewise sliding insertion thereinto and sliding removal therefrom of a dis-crete stud slot reducer pair 131 in an end elevation view of the spirit level 100B, namely, the T-shaped slot 142A is intended for use with a discrete stud slot reducer pair 131A and 131B, the T-shaped slot 142B is intended for use with a discrete stud slot reducer pair 131C and 131D, and the T-shaped slot 142C is intended for use with a discrete stud slot reducer pair 131E and 131F.

Each T-shaped slot 143 is configured for sidewise sliding insertion thereinto and sliding removal therefrom of a discrete stud slot reducer pair 136 in an end elevation view of the spirit level 100B, namely, the T-shaped slot 143A is intended for use with a discrete stud slot reducer pair 136A and 136B, the T-shaped slot 143B is intended for use with a discrete stud slot reducer pair 136C and 136D, and the T-shaped slot 143C is intended for use with a discrete stud slot reducer pair 136E and 136F.

The use of the spirit level 100B is now described:

FIG. 22 and FIG. 23 show the use of the spirit level 100B for setting a spaced apart pair of adjacent 60 mm wide upright studs US at the standard stud separation S1 and standard stud separation S2, respectively. The T-shaped slots 142A-142C store the set of discrete stud slot reducers 131A-131F and the T-shaped slots 143A-143C store the set of discrete stud slot reducers 136A-136F which are not in use.

FIG. 24 and FIG. 25 show the use of the spirit level 100B for setting a spaced apart pair of adjacent 50 mm wide upright studs at the standard stud separation S1 and standard stud separation S2, respectively. In FIG. 24, the spirit level 100B employs the discrete stud slot reducers 131A-131D inserted in the stud slot 121A and the stud slot 121B. In FIG. 25, the spirit level 100B employs the discrete stud slot reducers 131A and 131B in the stud slot 121A and the discrete stud slot reducers 131E and 131F in the stud slot 121C. The T-shaped slots 143A-143C store the set of discrete stud slot reducers 136A-136F which are not in use.

FIG. 26 and FIG. 27 show the use of the spirit level 100B for setting a spaced apart pair of adjacent 40 mm wide upright studs at the standard stud separation S1 and standard stud separation S2, respectively. In FIG. 26, the spirit level 100B employs the discrete stud slot reducers 136A-136D in the stud slot 121A and the stud slot 121B. In FIG. 27, the spirit level 100B employs the discrete stud slot reducers 136A and 136B in the stud slot 121A and the discrete stud slot reducers 136E and 136F in the stud slot 121C. The T-shaped slots 142A-142C store the set of stud slot reducers 131A-131F which are not in use.

Figures 28, 29:
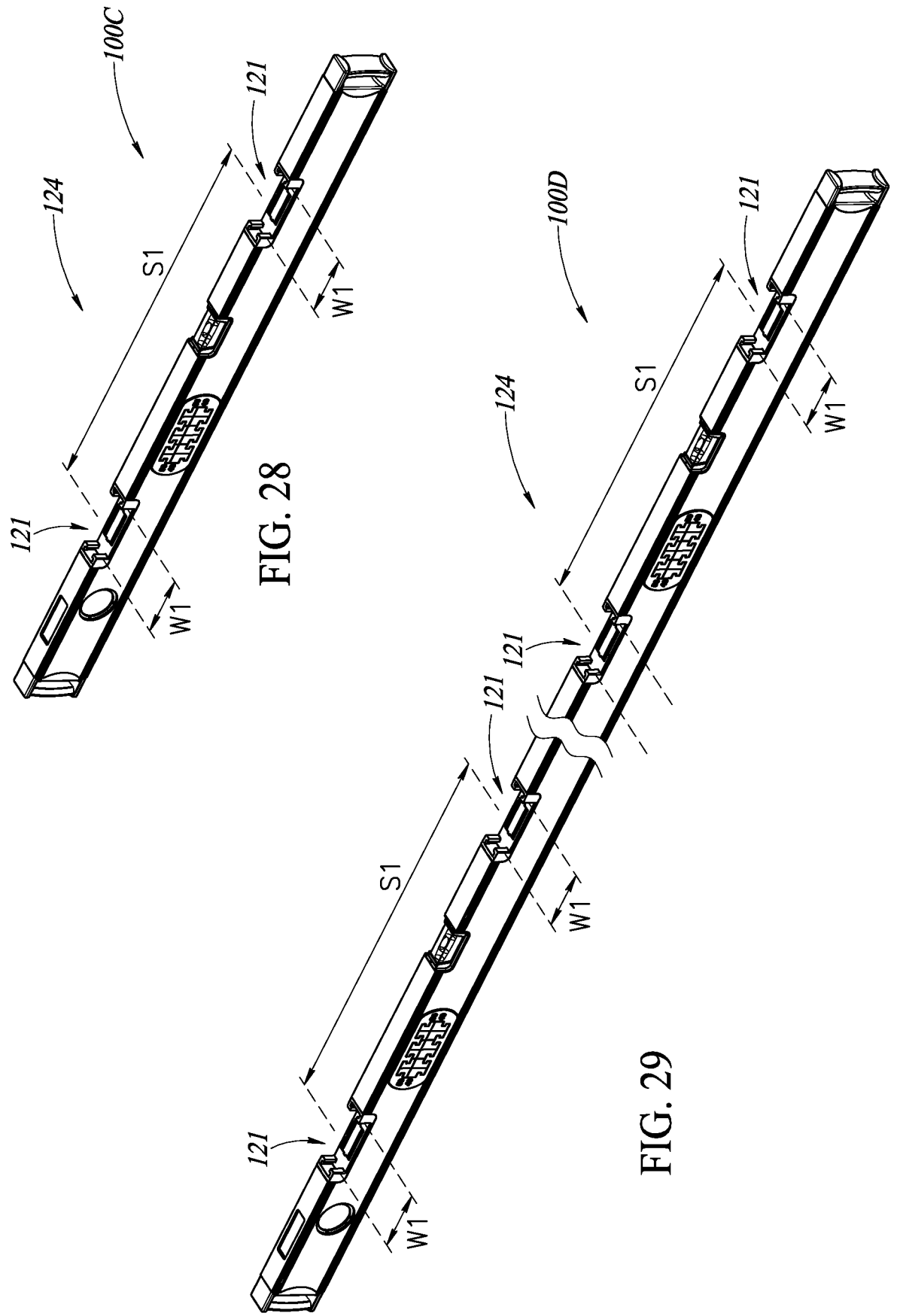
FIG. 28 is a pictorial view of a spirit level with discrete stud slot reducers for setting a single spaced apart pair of adjacent upright studs at the standard stud separation S1=400 mm only.
FIG. 29 is a pictorial view of a spirit level with discrete stud slot reducers for setting multiple spaced apart pairs of adjacent upright studs at the standard stud separation S1=400 mm only.

FIG. 28 shows a spirit level 100C with a stud slot reduction arrangement 124 for setting a single spaced apart pair of adjacent upright studs at the standard stud separation S1 only.

FIG. 29 shows a spirit level 100D with a stud slot reduction arrangement 124 for setting multiple spaced apart pairs of adjacent upright studs at the standard stud separation S1 only.

Figures 30, 31:
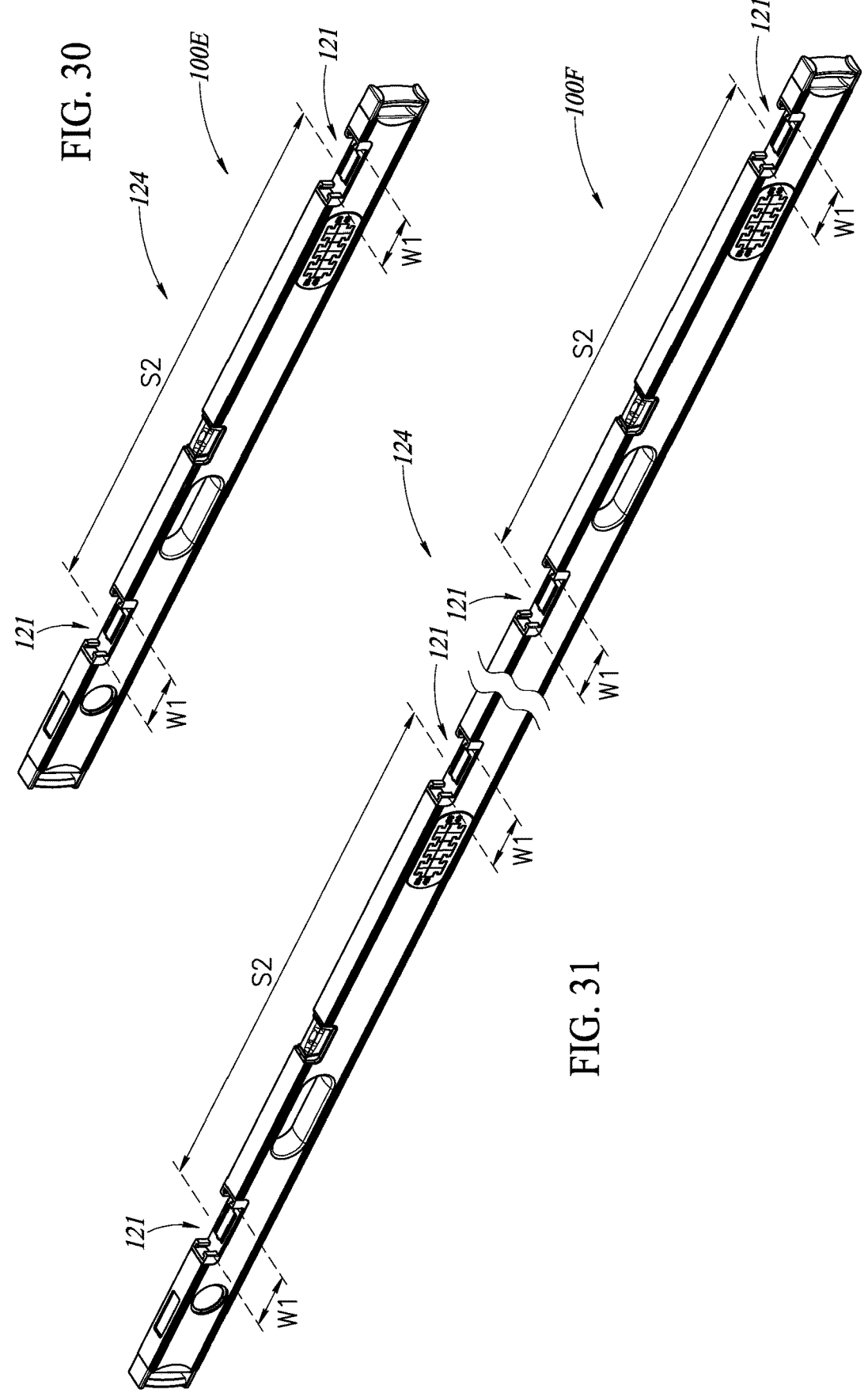
FIG. 30 is a pictorial view of a spirit level with discrete stud slot reducers for setting a single spaced apart pair of adjacent upright studs at the standard stud separation S2=600 mm only.
FIG. 31 is a pictorial view of a spirit level with discrete stud slot reducers for setting multiple spaced apart pair of adjacent upright studs at the standard stud separation S2=600 mm only.

FIG. 30 shows a spirit level 100E with a stud slot reduction arrangement 124 for setting a single spaced apart pair of adjacent upright studs at the standard stud separation only S2.

FIG. 31 shows a spirit level 100F with a stud slot reduction arrangement 124 for setting multiple spaced apart pair of adjacent upright studs at the standard stud separation S2 only.

Spirit Level with a Set of Screw-Operated Stud Slot Reduction Mechanisms

FIG. 32 to FIG. 35 show a spirit level 100G for setting a spaced apart pair of adjacent upright studs of the longest 60 mm standard stud width and either the 40 mm standard stud width or the 50 mm standard stud width at either the standard stud separation S1=400 mm or 417 mm or the standard stud separation S2=600 mm or 625 mm. The spirit level 100G has a similar construction as the spirit level 100B and therefore similar parts are likewise numbered. The spirit level 100G has a stud slot reduction arrangement 150 including a set of screw operated stud slot reduction mechanisms 151A-151C correspondingly fitted in the stud slots 121A-121C. In the present instance, the stud slot reduction mechanisms 151A-151C selectively reduce the stud slots 121A-121C's 60 mm standard stud slot width to the middle length 50 mm standard stud slot width.

Each screw-operated stud slot reduction mechanism 151 includes a stud slot reduction mechanism support 152 rigidly mounted in the main body 102. The stud slot reduction mechanism support 152 includes a horizontal stud slot reduction mechanism base 153 parallel to the leveling surface 103 and an opposite external pair of upright stud slot reduction mechanism side walls 154. The opposite external pair of upright stud slot reduction mechanism side walls 154 include an opposite internal pair of upright stud slot reduction mechanism side walls 156 spaced apart at the longest 60 mm standard stud slot width. The opposite internal pair of upright stud slot reduction mechanism side walls 156 support a horizontal stud slot reduction mechanism plate 157 bearing the magnet 122. The stud slot reduction mechanism plate 157 includes an opposite pair of stud slot reduction mechanism slots 158 adjacent the opposite internal pair of upright stud slot reduction mechanism side walls 156.

Each screw-operated stud slot reduction mechanism 151 includes a U-shaped stud slot reducer 159 deployed between the stud slot reduction mechanism base 153 and the stud slot reduction mechanism plate 157. The stud slot reducer 159 includes an opposite pair of stud slot reducer legs 161 aligned with the opposite pair of stud slot reduction mechanism slots 158. Each stud slot reducer leg 161 has a thickness THK3=5 mm such the opposite pair of stud slot reducer legs 161 reduce a stud slot width by 10 mm.

Each screw-operated stud slot reduction mechanism 151 includes a screw 162 traversing through the stud slot reduction mechanism plate 157 and the stud slot reducer 159 and stopping against the stud slot reduction mechanism base 153. The screw 162 has a screw head 162A exposed in the stud slot reduction mechanism plate 157 for affording convenient hand tool access for enabling linear displacement of the stud slot reducer 159 between two operative positions: A storage position in which the stud slot reducer 159 is deployed adjacent the stud slot reduction mechanism base 153 whereby the opposite pair of stud slot reducer legs 161 are flush with the stud slot reduction mechanism plate 157 for not shortening a stud slot width (see FIG. 33). And a stud slot reduction position in which the stud slot reducer 159 is deployed adjacent the stud slot reduction mechanism plate 157 whereby the opposite pair of stud slot reducer legs 161 protrude through the opposite pair of stud slot reduction mechanism slots 158 in front of the opposite internal pair of upright stud slot reduction mechanism side walls 156 for shortening a stud slot width (see FIG. 34).

A spirit level with screw operated stud slot reduction mechanisms 151 can be constructed similar to the spirit levels 100C and 100D for setting a single or multiple spaced apart pairs of adjacent upright studs at the standard stud separation S1 only. Alternatively, a spirit level with screw operated stud slot reduction mechanisms 151 can be constructed similar to the spirit levels 100E and 100F for setting a single or multiple spaced apart pairs of adjacent upright studs at the standard stud separation S2 only.

The use of the spirit level 100G is now described:

FIG. 36 and FIG. 37 show the use of the spirit level 100G for setting a spaced apart pair of adjacent 60 mm wide upright studs at the standard stud separation S1 and standard stud separation S2, respectively. The set of stud slot reducers 159A-159C are in their storage position in the main body 102.

FIG. 38 and FIG. 39 show the use of the spirit level 100G for setting a spaced apart pair of adjacent 50 mm wide upright studs at the standard stud separation S1 and standard stud separation S2, respectively. In FIG. 38, the stud slot reduction arrangement 150 is employed to shorten the stud slot 121A and the stud slot 121B's stud slot widths. In FIG. 39, the stud slot reduction arrangement 150 is employed to shorten the stud slot 121A and the stud slot 121C's stud slot widths.

Section 3: Castor Device Pair for Use with Ladders

Figures 40, 41, 42:
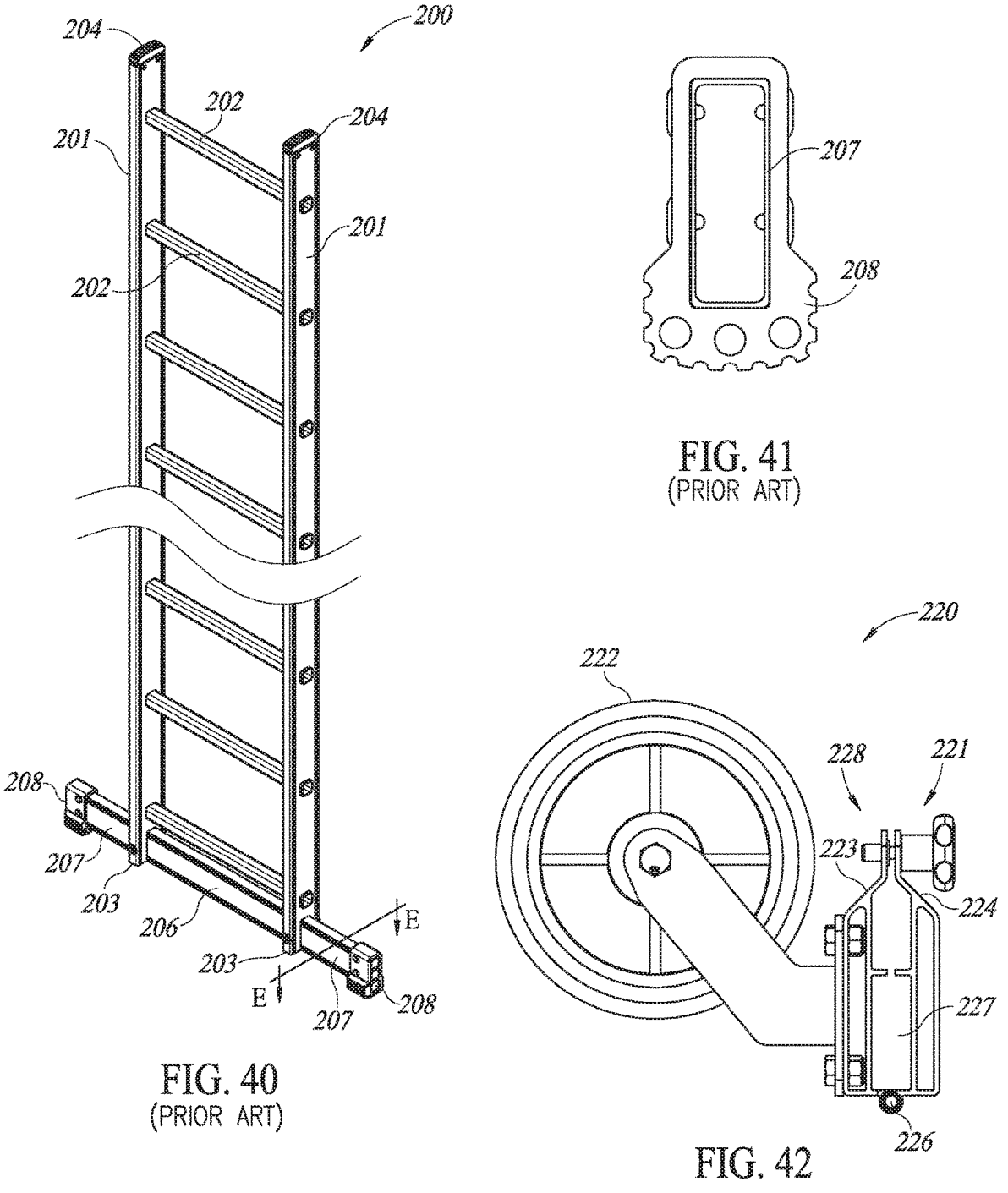
FIG. 40 is a pictorial view of a conventional leaning ladder with a stabilizer with anti-slip feet.
FIG. 41 is a transverse cross section of the leaning ladder along line E-E in FIG. 40.
FIG. 42 is a side elevation view of a caster device.

FIG. 40 shows a conventional leaning ladder 200 including a pair of parallel stiles 201 and a plurality of rungs 202 extending therebetween. The stiles 201 have a stile bottom 203 and a stile top 204 opposite the stile bottom 203. The ladder 200 includes a stabilizer 206 attached to the stile bottoms 203. The stabilizer 206 has stabilizer ends 207 outwardly extending widthwise beyond the stile bottoms 203. The stabilizer ends 207 are fitted with anti-slip feet 208 raising the stabilizer 206 above a flat surface. FIG. 41 shows the stabilizer 206 has a generally rectangular cross section with a major side co-directional with the ladder's length and a minor side transverse to the ladder's length.

Figures 43, 44, 45:
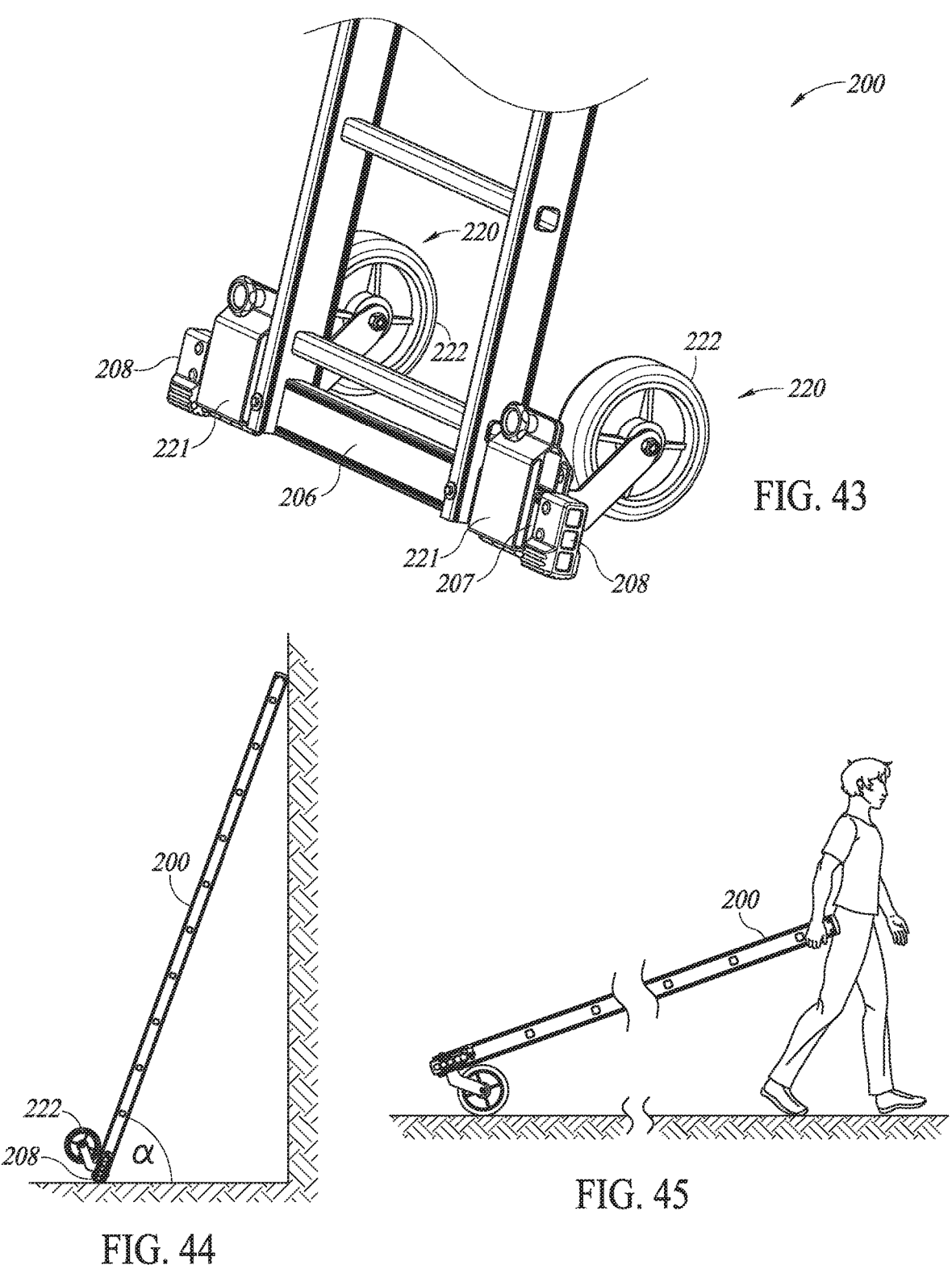
FIG. 43 is a pictorial view showing a caster device pair assembled on the leaning ladder's stabilizer.
FIG. 44 is a pictorial view showing the leaning ladder resting on the stabilizer in upright use.
FIG. 45 is a pictorial view showing a user wheeling a generally horizontal leaning ladder resting on the caster device pair.

FIG. 42 and FIG. 43 show a caster device 220 includes a caster clamp 221 for securely clamping on a stabilizer end 207 and a caster wheel 222 mounted on the caster clamp 221. The caster clamp 221 is preferably dimensioned to extend along a stabilizer end 207. The caster clamp 221 includes a major front plate 223, a major back plate 224 and a hinge 226 for hinging the major front plate 223 to the major back plate 224. The caster clamp 221 is shaped and dimensioned such that the hinge 226 does not interfere with a stabilized ladder resting on its anti-slip feet 208 in its upright position. The major front plate 223 and the major back plate 224 bound an internal cavity 227 shaped and dimensioned for snugly accommodating a stabilizer end 207 in a clamped state of the caster device 220. The caster clamp 221 includes a clamping arrangement 228 for securing same on a stabilizer end. Suitable clamping arrangements 228 include a screw and nut, and the like. The caster device 220 is designed such that its caster wheel 222 is deployed above a stile bottom 203 on resting the ladder 200 on its stabilizer 206 in upright use.

FIG. 43 to FIG. 45 show use of the caster device pair 220 as follows:

FIG. 44 shows the leaning ladder 200 resting on the stabilizer 206 and inclined against an upright wall at an angle α where 65°<α<75° with respect to the horizontal in accordance with the afore-mentioned standard. The caster wheels 222 are above the stabilizer 206 and therefore do not interfere with the upright use.

FIG. 45 shows a user holding the leaning ladder 200 generally horizontal and resting on the caster wheel pair 222 for convenient wheeling.

Figure 46:
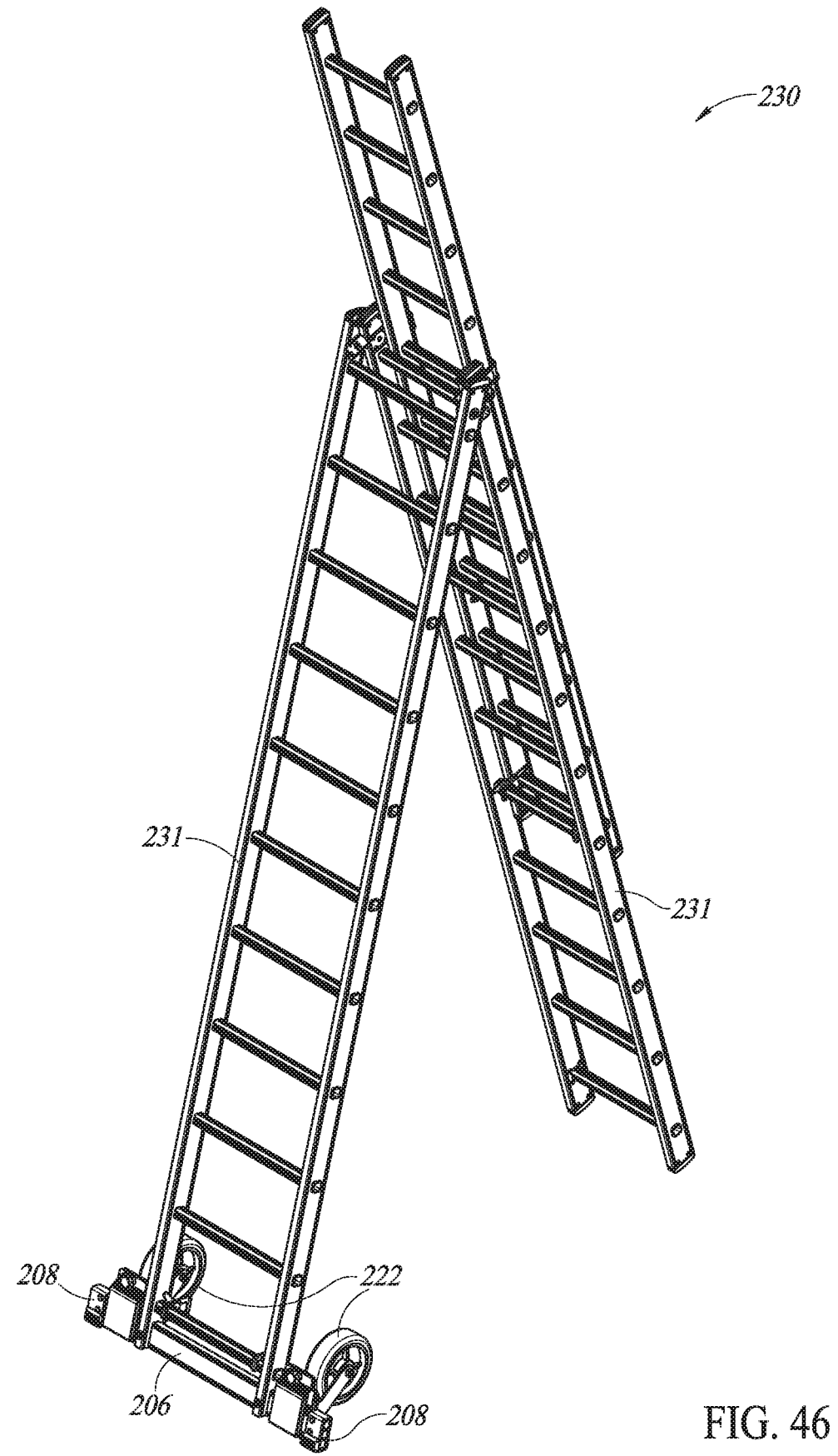
FIG. 46 is a pictorial view showing a self-standing ladder resting on the stabilizer in upright use.

FIG. 46 shows a self-standing ladder 230 having two legs 231 inclined at the same angle α where 65°<α<75° with respect to the horizontal in accordance with the afore-mentioned standard. The self-standing ladder 230 rests on the stabilizer 206 with the caster wheels 222 above the stabilizer 206 and therefore not interfering with the upright use.

While particular embodiments of the present invention are illustrated and described, it would be obvious to those skilled in the art that various other changes and modifications can be made without departing from the scope of the invention.

The invention claimed is:

1. A measurement device comprising:

(a) a base with a base setting surface for placing on a generally horizontal flat surface and a base top surface opposite said base setting surface, said base top surface having a central longitudinal centerline;

(b) a generally planar body mounted on said central longitudinal centerline such that said body stands upright on said base placed on a generally horizontal flat surface, said body having a first major body surface and a second major body surface, at least one of said first major body surface and said second major body surface having measurement markings, said body having an angle finder aperture between said first major body surface and said second major body surface; and (c) an angle finder mounted in said angle finder aperture, said angle finder including an angle finder housing and a bubble vial rotatably mounted in said angle finder housing, said angle finder housing having a first major angle finder housing surface parallel with said first major body surface and a second major angle finder housing surface parallel with said second major body surface, at least one of said first major angle finder housing surface and said second major angle finder housing surface have angular markings for indicating an angle of an inclined surface on setting said base setting surface thereon, wherein said base has a thickness T1, said body has a thickness T2 and said angle finder has a thickness T3 in a side elevation view of the measurement device facing said thicknesses, wherein T1>T3>T2 and said angle finder being slidingly mounted in said angle finder aperture in a transverse direction with respect to said central longitudinal centerline such that, in use, placing said first major body surface on a flat surface causes said second major angle finder surface to protrude from said second major body surface and placing said second major body surface on a flat surface causes said first major angle finder surface to protrude from said first major body surface.

2. The device according to claim 1 wherein said base includes a base front surface and a base rear surface opposite the base front surface and an angle finder channel between said base front surface and said base rear surface, said angle finder channel being continuous with said angle finder aperture such that said angle finder is slidingly mounted in both said base and said body in said transverse direction with respect to said central longitudinal centerline.

3. The device according to claim 2 wherein said thickness T3 is dimensioned such that, on placing said first major body surface on a flat surface, said second major angle finder surface is flush with said base rear surface and, on placing said second major body surface on a flat surface, said first major angle finder surface is flush with said base front surface.

4. The device according to claim 1 configured as a speed square.

5. The device according to claim 1 configured as a combination square.

6. The device according to claim 1 configured as a right-angle square.

7. The device according to claim 2 configured as a speed square.

8. The device according to claim 2 configured as a combination square.

9. The device according to claim 2 configured as a right-angle square.

10. The device according to claim 3 configured as a speed square.

11. The device according to claim 3 configured as a combination square.

12. The device according to claim 3 configured as a right-angle square.

\* \* \* \* \*